US00RE47918E

(19) United States
(12) Reissued Patent
Wallace

(10) Patent Number: US RE47,918 E
(45) Date of Reissued Patent: Mar. 31, 2020

(54) SYSTEM FOR TRACKING AND ANALYZING WELDING ACTIVITY

(71) Applicant: LINCOLN GLOBAL, INC., City of Industry, CA (US)

(72) Inventor: Matthew Wayne Wallace, South Windsor, CT (US)

(73) Assignee: Lincoln Global, Inc., Santa Fe Springs, CA (US)

(21) Appl. No.: 14/589,317

(22) Filed: Jan. 5, 2015

Related U.S. Patent Documents

Reissue of:
(64) Patent No.: 8,274,013
Issued: Sep. 25, 2012
Appl. No.: 12/719,053
Filed: Mar. 8, 2010

U.S. Applications:
(63) Continuation of application No. 14/177,692, filed on Feb. 11, 2014, now Pat. No. Re. 45,398, which is an application for the reissue of Pat. No. 8,274,013.

(60) Provisional application No. 61/158,578, filed on Mar. 9, 2009.

(51) Int. Cl.
*B23K 9/06* (2006.01)
*B23K 9/095* (2006.01)

(52) U.S. Cl.
CPC ..... *B23K 9/0953* (2013.01)

(58) Field of Classification Search
CPC ..... B23K 9/0953
USPC ..... 219/137 R, 136, 124.34
See application file for complete search history.

(56) References Cited

U.S. PATENT DOCUMENTS

| | | | |
|---|---|---|---|
| 317,063 | A | 5/1885 | Wittenstrom |
| 428,459 | A | 5/1890 | Oopfin |
| 483,428 | A | 9/1892 | Goppin |
| 1,159,119 | A | 11/1915 | Springer |
| D140,630 | S | 3/1945 | Garibay |
| D142,377 | S | 9/1945 | Dunn |
| D152,049 | S | 12/1948 | Welch |

(Continued)

FOREIGN PATENT DOCUMENTS

| | | |
|---|---|---|
| CA | 2698078 | 9/2011 |
| CN | 101193723 A | 6/2008 |

(Continued)

OTHER PUBLICATIONS

International Search Report and Written Opinion from PCT/IB09/000605 dated Feb. 12, 2010.

(Continued)

*Primary Examiner* — William C Doerrler
(74) *Attorney, Agent, or Firm* — Calfee, Halter & Griswold LLP

(57) ABSTRACT

A system and a method for tracking and analyzing welding activity. Dynamic spatial properties of a welding tool are sensed during a welding process producing a weld. The sensed dynamic spatial properties are tracked over time and the tracked dynamic spatial properties are captured as tracked data during the welding process. The tracked data is analyzed to determine performance characteristics of a welder performing the welding process and quality characteristics of a weld produced by the welding process. The performance characteristics and the quality characteristics may be subsequently reviewed.

13 Claims, 6 Drawing Sheets

(56) References Cited

U.S. PATENT DOCUMENTS 2,681,969 A 6/1954 Burke
D174,208 S 3/1955 Abidgaard
2,728,838 A 12/1955 Barnes
D176,942 S 2/1956 Cross
2,894,086 A 7/1959 Rizer
3,035,155 A 5/1962 Hawk
3,059,519 A 10/1962 Stanton
3,356,823 A 12/1967 Waters
3,555,239 A 1/1971 Kerth
3,621,177 A 11/1971 McPherson et al.
3,654,421 A 4/1972 Streetman et al.
3,739,140 A 6/1973 Rotilio
3,866,011 A 2/1975 Cole et al.
3,867,769 A 2/1975 Schow et al.
3,904,845 A 9/1975 Minkiewicz et al.
3,988,913 A 11/1976 Metcalfe et al.
D243,459 S 2/1977 Bliss
4,024,371 A 5/1977 Drake
4,041,615 A 8/1977 Whitehill
D247,421 S 3/1978 Driscoll
4,124,944 A 11/1978 Blair
4,132,014 A 1/1979 Schow
4,237,365 A 12/1980 Lambros et al.
4,280,041 A 7/1981 Kiessling et al.
4,280,042 A 7/1981 Berger
4,280,137 A 7/1981 Ashida et al.
4,314,125 A 2/1982 Nakamura
4,354,087 A 10/1982 Osterlitz
4,359,622 A 11/1982 Dostoomian et al.
4,375,026 A 2/1983 Kearney
4,410,787 A 10/1983 Kremers
4,429,266 A 1/1984 Traadt
4,452,589 A 6/1984 Denison
D275,292 S 8/1984 Bouman
D277,761 S 2/1985 Korovin et al.
4,525,619 A 6/1985 Ide et al.
D280,329 S 8/1985 Bouman
4,611,111 A 9/1986 Baheti et al.
4,616,326 A 10/1986 Meier et al.
4,629,860 A 12/1986 Linbom
4,677,277 A 6/1987 Cook et al.
4,680,014 A 7/1987 Paton et al.
4,689,021 A 8/1987 Vasiliev et al.
4,707,582 A 11/1987 Beyer
4,716,273 A 12/1987 Paton et al.
D297,704 S 9/1988 Bulow
4,867,685 A 9/1989 Brush et al.
4,877,940 A 10/1989 Bangs et al.
4,897,521 A 1/1990 Burr
4,907,973 A 3/1990 Hon
4,931,018 A 6/1990 Herbst et al.
4,973,814 A * 11/1990 Kojima et al. ..... 219/110
4,998,050 A 3/1991 Nishiyama et al.
5,034,593 A 7/1991 Rice et al.
5,061,841 A 10/1991 Richardson
5,089,914 A 2/1992 Prescott
5,192,845 A 3/1993 Kirmsse et al.
5,206,472 A 4/1993 Myking et al.
5,266,930 A 11/1993 Ichikawa et al.
5,285,916 A 2/1994 Ross
5,305,183 A 4/1994 Teynor
5,320,538 A 6/1994 Baum
5,337,611 A 8/1994 Fleming et al.
5,360,156 A 11/1994 Ishizaka et al.
5,360,960 A 11/1994 Shirk
5,370,071 A 12/1994 Ackermann
D359,296 S 6/1995 Witherspoon
5,424,634 A 6/1995 Goldfarb et al.
5,436,638 A 7/1995 Bolas et al.
5,464,957 A 11/1995 Kidwell
D365,583 S 12/1995 Viken
5,562,843 A 10/1996 Yasumoto
5,662,822 A 9/1997 Tada
5,670,071 A 9/1997 Ueyama et al.
5,676,503 A 10/1997 Lang
5,676,867 A 10/1997 Allen
5,708,253 A 1/1998 Bloch et al.
5,710,405 A 1/1998 Solomon et al.
5,719,369 A 2/1998 White et al.
D392,534 S 3/1998 Degen
5,728,991 A 3/1998 Takada et al.
5,751,258 A 5/1998 Fergason et al.
D395,296 S 6/1998 Kaye et al.
D396,238 S 7/1998 Schmitt
5,781,258 A 7/1998 Debral et al.
5,823,785 A 10/1998 Matherne, Jr.
5,835,077 A 11/1998 Dao et al.
5,835,277 A 11/1998 Hegg
5,845,053 A 12/1998 Watanabe
5,877,777 A 3/1999 Colwell
5,963,891 A 10/1999 Walker et al.
6,008,470 A 12/1999 Zhang
6,037,948 A 3/2000 Liepa
6,049,059 A 4/2000 Kim
6,051,805 A 4/2000 Vaidya et al.
6,114,645 A 9/2000 Burgess
6,155,475 A 12/2000 Ekelof et al.
6,155,928 A 12/2000 Burdick
6,179,619 B1 1/2001 Tanaka
6,230,327 B1 5/2001 Briand et al.
6,236,013 B1 5/2001 Delzenne
6,236,017 B1 5/2001 Smartt et al.
6,242,711 B1 6/2001 Cooper
6,271,500 B1 8/2001 Hirayam et al.
6,330,938 B1 12/2001 Herve et al.
6,330,966 B1 12/2001 Eissfeller
6,331,848 B1 12/2001 Stove et al.
D456,428 S 4/2002 Aronson et al.
6,373,465 B2 4/2002 Jolly et al.
D456,828 S 5/2002 Aronson et al.
D461,383 S 8/2002 Blackburn
6,441,342 B1 8/2002 Hsu
6,445,964 B1 9/2002 White et al.
6,492,618 B1 12/2002 Flood et al.
6,506,997 B2 1/2003 Matsuyama
6,552,303 B1 4/2003 Blankenship et al.
6,560,029 B1 5/2003 Dobbie et al.
6,563,489 B1 5/2003 Latypov et al.
6,568,846 B1 5/2003 Cote et al.
D475,726 S 6/2003 Suga et al.
6,572,379 B1 6/2003 Sears et al.
6,583,386 B1 * 6/2003 Ivkovich ..... 219/130.01
6,621,049 B2 9/2003 Suzuki
6,624,388 B1 9/2003 Blankenship et al.
D482,171 S 11/2003 Vui et al.
6,647,288 B2 11/2003 Madill et al.
6,649,858 B2 11/2003 Wakeman
6,655,645 B1 12/2003 Lu et al.
6,660,965 B2 12/2003 Simpson
6,697,701 B2 2/2004 Hillen et al.
6,697,770 B1 2/2004 Nagetgall
6,703,585 B2 3/2004 Suzuki
6,708,385 B1 3/2004 Lemelson
6,710,298 B2 3/2004 Eriksson
6,710,299 B2 3/2004 Blankenship et al.
6,715,502 B1 4/2004 Rome et al.
D490,347 S 5/2004 Meyers
6,730,875 B2 5/2004 Hsu
6,734,393 B1 5/2004 Friedl et al.
6,744,011 B1 6/2004 Hu et al.
6,750,428 B2 6/2004 Okamoto et al.
6,765,584 B1 7/2004 Wloka
6,772,802 B2 8/2004 Few
6,788,442 B1 9/2004 Potin et al.
6,795,778 B2 9/2004 Dodge et al.
6,798,974 B1 9/2004 Nakano et al.
6,857,553 B1 2/2005 Hartman et al.
6,858,817 B2 2/2005 Blankenship et al.
6,865,926 B2 3/2005 O'Brien et al.
D504,449 S 4/2005 Butchko
6,920,371 B2 7/2005 Hillen et al.
6,940,037 B1 9/2005 Kovacevic et al.
6,940,039 B2 9/2005 Blankepship et al.
7,021,937 B2 4/2006 Simpson et al.

(56) References Cited

U.S. PATENT DOCUMENTS 7,024,342 B1 4/2006 Waite
7,126,078 B2 10/2006 Demers et al.
7,132,617 B2 11/2006 Lee et al.
7,170,032 B2 1/2007 Flood
7,194,447 B2 3/2007 Harvey et al.
7,247,814 B2 7/2007 Ott
D555,446 S 11/2007 Ibarrondo et al.
7,315,241 B1 1/2008 Daily et al.
D561,973 S 2/2008 Kinsley et al.
7,353,715 B2 4/2008 Myers
7,363,137 B2 4/2008 Brant et al.
7,375,304 B2 5/2008 Kainec et al.
7,381,923 B2 6/2008 Gordon et al.
7,414,595 B1 8/2008 Muffler
7,465,230 B2 12/2008 LeMay et al.
7,478,108 B2 1/2009 Townsend et al.
D587,975 S 3/2009 Aronson et al.
7,516,022 B2 4/2009 Lee et al.
7,580,821 B2 8/2009 Schirm
D602,057 S 10/2009 Osicki
7,621,171 B2 11/2009 O'Brien
D606,102 S 12/2009 Bender et al.
7,643,890 B1 1/2010 Hillen et al.
7,687,741 B2 3/2010 Kainec et al.
D614,217 S 4/2010 Peters et al.
D615,573 S 5/2010 Peters et al.
7,817,162 B2 10/2010 Bolick et al.
7,853,645 B2 12/2010 Brown
D631,074 S 1/2011 Peters et al.
7,874,921 B2 1/2011 Baszucki et al.
7,970,172 B1 6/2011 Hendrickson
7,972,129 B2 7/2011 O'Donoghue
7,991,587 B2 8/2011 Ihn
8,069,017 B2 11/2011 Hallquist
8,224,881 B1 7/2012 Spear et al.
8,248,324 B2 8/2012 Nangle
8,265,886 B2 9/2012 Bisiaux et al.
8,274,013 B2 9/2012 Wallace
8,287,522 B2 10/2012 Moses et al.
8,316,462 B2 11/2012 Becker et al.
8,363,048 B2 1/2013 Gering
8,365,603 B2 2/2013 Lesage et al.
8,512,043 B2 8/2013 Choquet
8,569,646 B2 10/2013 Daniel et al.
8,657,605 B2 2/2014 Wallace
8,680,434 B2 3/2014 Stoger
8,747,116 B2 6/2014 Zboray
8,777,629 B2 7/2014 Kreindl et al.
RE45,062 E 8/2014 Maguire, Jr.
8,851,896 B2 10/2014 Wallace
8,860,760 B2 10/2014 Chen
RE45,398 E * 3/2015 Wallace ..... 219/137 R
8,992,226 B1 3/2015 Leach
9,011,154 B2 4/2015 Kindig
9,293,056 B2 3/2016 Zboray
9,293,057 B2 3/2016 Zboray
9,318,026 B2 4/2016 Peters
9,323,056 B2 4/2016 Williams
9,761,153 B2 9/2017 Zboray et al.
9,767,712 B2 9/2017 Postlethwaite
9,779,636 B2 10/2017 Zboray et al.
9,818,312 B2 11/2017 Zboray et al.
9,836,994 B2 12/2017 Kinding et al.
9,911,359 B2 3/2018 Wallace
9,911,360 B2 3/2018 Wallace
9,928,755 B2 3/2018 Wallace et al.
2001/0045808 A1 11/2001 Hietmann et al.
2001/0052893 A1 12/2001 Jolly et al.
2002/0032553 A1 3/2002 Simpson et al.
2002/0046999 A1 4/2002 Veikkolainen
2002/0050984 A1 5/2002 Roberts
2002/0085843 A1 7/2002 Mann
2002/0175897 A1 11/2002 Pelosi
2003/0000931 A1 1/2003 Ueda
2003/0023592 A1 1/2003 Modica et al.
2003/0025884 A1 2/2003 Hamana et al.
2003/0069866 A1 4/2003 Ohno
2003/0075534 A1* 4/2003 Okamoto et al. ..... 219/125.1
2003/0106787 A1 6/2003 Santilli
2003/0111451 A1 6/2003 Blankenship et al.
2003/0172032 A1 9/2003 Choquet
2003/0186199 A1 10/2003 McCool
2003/0234885 A1 12/2003 Pilu
2004/0020907 A1 2/2004 Zauner et al.
2004/0035990 A1 2/2004 Ackeret
2004/0050824 A1 3/2004 Samler
2004/0088071 A1 5/2004 Kouno
2004/0140301 A1 7/2004 Blankenship et al.
2004/0181382 A1 9/2004 Hu et al.
2004/0217096 A1 11/2004 Lipnevicius
2005/0007504 A1 1/2005 Fergason
2005/0017152 A1 1/2005 Fergason
2005/0029326 A1 2/2005 Henrikson
2005/0046584 A1 3/2005 Breed
2005/0050168 A1 3/2005 Wen et al.
2005/0101767 A1 5/2005 Clapham et al.
2005/0103766 A1 5/2005 Iizuka et al.
2005/0103767 A1 5/2005 Kainec et al.
2005/0109735 A1 5/2005 Flood
2005/0128186 A1 6/2005 Shahoian et al.
2005/0133488 A1 6/2005 Blankenship et al.
2005/0159840 A1 7/2005 Lin et al.
2005/0163364 A1 7/2005 Beck et al.
2005/0189336 A1 9/2005 Ku
2005/0199602 A1 9/2005 Kaddani et al.
2005/0230573 A1 10/2005 Ligertwood
2005/0252897 A1 11/2005 Hsu
2005/0275913 A1 12/2005 Vesely et al.
2005/0275914 A1 12/2005 Vesely et al.
2006/0014130 A1 1/2006 Weinstein
2006/0076321 A1 4/2006 Maev et al.
2006/0136183 A1 6/2006 Choquet
2006/0142656 A1 6/2006 Malackowski et al.
2006/0154226 A1 7/2006 Maxfield
2006/0163227 A1 7/2006 Hillen et al.
2006/0163228 A1 7/2006 Daniel
2006/0166174 A1 7/2006 Rowe et al.
2006/0169682 A1 8/2006 Kainec et al.
2006/0173619 A1 8/2006 Brant et al.
2006/0189260 A1 8/2006 Sung
2006/0207980 A1 9/2006 Jacovetty et al.
2006/0213892 A1 9/2006 Ott
2006/0214924 A1 9/2006 Kawamoto et al.
2006/0226137 A1 10/2006 Huismann et al.
2006/0252543 A1 11/2006 Van Noland et al.
2006/0258447 A1 11/2006 Baszucki et al.
2007/0034611 A1 2/2007 Drius et al.
2007/0038400 A1 2/2007 Lee et al.
2007/0045488 A1 3/2007 Shin
2007/0088536 A1 4/2007 Ishikawa
2007/0112889 A1 5/2007 Cook et al.
2007/0198117 A1 8/2007 Wajihuddin
2007/0209586 A1 9/2007 Ebensberger et al.
2007/0211026 A1 9/2007 Ohta
2007/0221797 A1 9/2007 Thompson et al.
2007/0256503 A1 11/2007 Wong et al.
2007/0277611 A1 12/2007 Portzgen et al.
2007/0291035 A1 12/2007 Vesely et al.
2008/0021311 A1 1/2008 Goldbach
2008/0031774 A1 2/2008 Magnant et al.
2008/0038702 A1 2/2008 Choquet
2008/0061113 A9 3/2008 Seki et al.
2008/0078811 A1 4/2008 Hillen et al.
2008/0078812 A1 4/2008 Peters et al.
2008/0117203 A1 5/2008 Gering
2008/0120075 A1 5/2008 Wloka
2008/0128398 A1 6/2008 Schneider
2008/0135533 A1 6/2008 Ertmer et al.
2008/0140815 A1 6/2008 Brant et al.
2008/0149686 A1 6/2008 Daniel et al.
2008/0203075 A1 8/2008 Feldhausen et al.
2008/0233550 A1 9/2008 Solomon
2008/0303197 A1 12/2008 Paquette et al.
2008/0314887 A1 12/2008 Stoger

(56) References Cited

U.S. PATENT DOCUMENTS

| | | | | |
|---|---|---|---|---|
| 2009/0015585 | A1 | 1/2009 | Klusza | |
| 2009/0021514 | A1 | 1/2009 | Klusza | |
| 2009/0045183 | A1 | 2/2009 | Artelsmair et al. | |
| 2009/0050612 | A1 | 2/2009 | Serruys | |
| 2009/0057286 | A1 | 3/2009 | Ihara | |
| 2009/0139968 | A1* | 6/2009 | Hesse | B23K 26/04 219/121.63 |
| 2009/0152251 | A1 | 6/2009 | Dantinne et al. | |
| 2009/0173726 | A1 | 7/2009 | Davidson et al. | B23K 9/0956 219/130.01 |
| 2009/0184098 | A1 | 7/2009 | Daniel et al. | |
| 2009/0200281 | A1 | 8/2009 | Hampton | |
| 2009/0200282 | A1 | 8/2009 | Hampton | |
| 2009/0231423 | A1 | 9/2009 | Becker | |
| 2009/0259444 | A1 | 10/2009 | Dolansky et al. | |
| 2009/0298024 | A1 | 12/2009 | Batzler et al. | |
| 2009/0325699 | A1 | 12/2009 | Delgiannidis | |
| 2010/0012017 | A1 | 1/2010 | Miller | |
| 2010/0012637 | A1 | 1/2010 | Jaeger | |
| 2010/0048273 | A1 | 2/2010 | Wallace et al. | |
| 2010/0062405 | A1 | 3/2010 | Zboray et al. | |
| 2010/0062406 | A1 | 3/2010 | Zboray et al. | |
| 2010/0096373 | A1 | 4/2010 | Hillen et al. | |
| 2010/0121472 | A1 | 5/2010 | Babu et al. | |
| 2010/0133247 | A1* | 6/2010 | Mazumder et al. | 219/121.83 |
| 2010/0133250 | A1 | 6/2010 | Sardy et al. | |
| 2010/0176107 | A1 | 7/2010 | Bong | |
| 2010/0201803 | A1 | 8/2010 | Melikian | |
| 2010/0224610 | A1 | 9/2010 | Wallace | |
| 2010/0276396 | A1 | 11/2010 | Cooper et al. | |
| 2010/0299101 | A1 | 11/2010 | Shimada et al. | |
| 2010/0307249 | A1 | 12/2010 | Lesage et al. | |
| 2011/0006047 | A1 | 1/2011 | Penrod et al. | |
| 2011/0060568 | A1 | 3/2011 | Goldfine et al. | |
| 2011/0091846 | A1 | 4/2011 | Kreindl et al. | |
| 2011/0114615 | A1 | 5/2011 | Daniel et al. | |
| 2011/0116076 | A1 | 5/2011 | Chanty et al. | |
| 2011/0117527 | A1 | 5/2011 | Conrardy et al. | |
| 2011/0122495 | A1 | 5/2011 | Togashi | |
| 2011/0183304 | A1 | 7/2011 | Wallace | |
| 2011/0187746 | A1 | 8/2011 | Suto | |
| 2011/0248864 | A1 | 10/2011 | Becker et al. | |
| 2011/0290765 | A1 | 12/2011 | Albrecht et al. | |
| 2011/0316516 | A1 | 12/2011 | Schiefermuller et al. | |
| 2012/0122062 | A1 | 5/2012 | Yang | |
| 2012/0189993 | A1 | 7/2012 | Kindig | |
| 2012/0291172 | A1 | 11/2012 | Wills et al. | |
| 2012/0298640 | A1 | 11/2012 | Conrardy et al. | |
| 2013/0026150 | A1 | 1/2013 | Chanty et al. | |
| 2013/0040270 | A1 | 2/2013 | Albrecht | |
| 2013/0049976 | A1 | 2/2013 | Maggiore | |
| 2013/0075380 | A1 | 3/2013 | Albrech et al. | |
| 2013/0182070 | A1 | 7/2013 | Peters et al. | |
| 2013/0183645 | A1 | 7/2013 | Wallace et al. | |
| 2013/0189657 | A1 | 7/2013 | Wallace et al. | |
| 2013/0189658 | A1 | 7/2013 | Peters et al. | |
| 2013/0209976 | A1 | 8/2013 | Postlethwaite et al. | |
| 2013/0230832 | A1 | 9/2013 | Peters et al. | |
| 2013/0231980 | A1 | 9/2013 | Elgart | |
| 2013/0327747 | A1 | 12/2013 | Dantinne | |
| 2014/0017642 | A1 | 1/2014 | Postelthwaite et al. | |
| 2014/0038143 | A1 | 2/2014 | Daniel et al. | |
| 2014/0065584 | A1 | 3/2014 | Wallace et al. | |
| 2014/0134579 | A1 | 5/2014 | Becker | |
| 2014/0134580 | A1 | 5/2014 | Becker | |
| 2014/0220522 | A1 | 8/2014 | Peters | |
| 2014/0263224 | A1 | 9/2014 | Becker | |
| 2014/0272835 | A1 | 9/2014 | Becker | |
| 2014/0272836 | A1 | 9/2014 | Becker | |
| 2014/0272837 | A1 | 9/2014 | Becker | |
| 2014/0272838 | A1 | 9/2014 | Becker | |
| 2014/0312020 | A1 | 10/2014 | Daniel | |
| 2014/0315167 | A1 | 10/2014 | Kreindl et al. | |
| 2014/0322684 | A1 | 10/2014 | Wallace et al. | |
| 2014/0346158 | A1 | 11/2014 | Matthews | |
| 2015/0056584 | A1 | 2/2015 | Boulware | |
| 2015/0056585 | A1 | 2/2015 | Boulware et al. | |
| 2015/0056586 | A1 | 2/2015 | Penrod et al. | |
| 2016/0125763 | A1 | 5/2016 | Becker | |
| 2016/0260261 | A1 | 9/2016 | Hsu | |

FOREIGN PATENT DOCUMENTS

| | | | |
|---|---|---|---|
| CN | 10214178 | | 7/2008 |
| CN | 101209512 | | 7/2008 |
| CN | 201083660 | | 7/2008 |
| CN | 101419755 | | 4/2009 |
| CN | 101419755 | A1 | 4/2009 |
| CN | 201229711 | | 4/2009 |
| CN | 101571887 | | 11/2009 |
| CN | 101587659 | | 11/2009 |
| CN | 101587659 | A | 11/2009 |
| CN | 102165504 | | 8/2011 |
| CN | 102171744 | A | 8/2011 |
| CN | 202684308 | U | 1/2013 |
| CN | 103871279 | | 6/2014 |
| CN | 102014819 | | 7/2014 |
| CN | 107316544 | A | 11/2017 |
| DE | 2833638 | | 2/1980 |
| DE | 3046634 | | 1/1984 |
| DE | 3244307 | | 5/1984 |
| DE | 3522581 | | 1/1987 |
| DE | 4037879 | A1 | 6/1991 |
| DE | 19615069 | | 10/1997 |
| DE | 19739720 | | 10/1998 |
| DE | 19834205 | A1 | 2/2000 |
| DE | 20009543 | | 8/2001 |
| DE | 102005047204 | | 4/2007 |
| DE | 102010038902 | | 9/2012 |
| DE | 202012013151 | | 2/2015 |
| EP | 108599 | | 5/1984 |
| EP | 127299 | | 12/1984 |
| EP | 145891 | | 6/1985 |
| EP | 319623 | | 6/1989 |
| EP | 0852986 | A1 | 7/1998 |
| EP | 1527852 | | 5/2005 |
| EP | 1905533 | | 4/2008 |
| ES | 2274736 | A1 | 5/2007 |
| ES | 2274736 | | 3/2008 |
| FR | 1456780 | | 3/1965 |
| FR | 2827066 | | 1/2003 |
| FR | 2926660 | | 7/2009 |
| GB | 1455972 | | 11/1976 |
| GB | 1511608 | | 5/1978 |
| GB | 2254172 | | 9/1992 |
| GB | 2435838 | A | 9/2007 |
| GB | 2454232 | | 6/2009 |
| JP | 478719 | S | 10/1972 |
| JP | 5098035 | U | 8/1975 |
| JP | 2224877 | | 9/1990 |
| JP | 5329645 | | 12/1993 |
| JP | 7047471 | | 2/1995 |
| JP | 7232270 | | 9/1995 |
| JP | 8132274 | | 5/1996 |
| JP | 8150476 | | 6/1996 |
| JP | 8505091 | | 6/1996 |
| JP | 11104833 | | 4/1999 |
| JP | 2000167666 | | 6/2000 |
| JP | 2000237872 | A | 9/2000 |
| JP | 2001071140 | | 3/2001 |
| JP | 2002278670 | | 9/2002 |
| JP | 2002366021 | A | 12/2002 |
| JP | 2003200372 | | 7/2003 |
| JP | 2003271048 | A | 9/2003 |
| JP | 2003326362 | | 11/2003 |
| JP | 2006006604 | | 1/2006 |
| JP | 2006175205 | | 7/2006 |
| JP | 2006281270 | | 10/2006 |
| JP | 2007290025 | | 11/2007 |
| JP | 2009500178 | | 1/2009 |
| JP | 2009160636 | | 7/2009 |
| JP | 2010231792 | | 10/2010 |
| JP | 2011528283 | | 11/2011 |
| JP | 2012024867 | | 2/2012 |

(56) References Cited

FOREIGN PATENT DOCUMENTS

| | | | |
|---|---|---|---|
| JP | 2013091086 | A | 5/2013 |
| KR | 100876425 | | 12/2008 |
| KR | 20090010693 | | 1/2009 |
| KR | 20090010693 | A | 1/2009 |
| KR | 1020110068544 | | 6/2011 |
| RU | 2008108601 | | 11/2009 |
| SU | 1038963 | | 8/1983 |
| WO | WO9845078 | | 10/1998 |
| WO | 0112376 | A1 | 2/2001 |
| WO | 001009867 | | 2/2001 |
| WO | WO0143910 | | 6/2001 |
| WO | 0158400 | A1 | 8/2001 |
| WO | 2005102230 | A1 | 11/2005 |
| WO | 2006034571 | A1 | 4/2006 |
| WO | WO2006034571 | | 4/2006 |
| WO | WO2007009131 | A1 | 1/2007 |
| WO | WO2007039278 | | 4/2007 |
| WO | 2009120921 | | 1/2009 |
| WO | WO2009060231 | | 5/2009 |
| WO | WO2009149740 | | 12/2009 |
| WO | WO2010000003 | | 1/2010 |
| WO | 2010020867 | | 2/2010 |
| WO | 2010020870 | | 2/2010 |
| WO | 2010044982 | | 4/2010 |
| WO | WO2010091493 | | 8/2010 |
| WO | 2011045654 | | 4/2011 |
| WO | 2011058433 | | 5/2011 |
| WO | WO2011067447 | | 6/2011 |
| WO | 2011097035 | A2 | 8/2011 |
| WO | 2011148258 | A2 | 12/2011 |
| WO | 2012082105 | | 6/2012 |
| WO | 2012137060 | A1 | 10/2012 |
| WO | WO2012143327 | | 10/2012 |
| WO | 2013008235 | | 1/2013 |
| WO | WO2013014202 | | 1/2013 |
| WO | 2013025672 | A1 | 2/2013 |
| WO | 2013061518 | | 5/2013 |
| WO | 2013114189 | | 8/2013 |
| WO | 2013175079 | | 11/2013 |
| WO | 2014007830 | | 1/2014 |
| WO | 2014019045 | | 2/2014 |
| WO | 2014020386 | | 2/2014 |
| WO | 2014140722 | A1 | 9/2014 |
| WO | 2016137578 | A1 | 1/2016 |
| WO | 2014140721 | | 9/2017 |

OTHER PUBLICATIONS

International Search Report and Written Opinion from PCT/IB10/02913 dated Apr. 19, 2011.

ASME Definitions, Consumables, Welding Positions, dated Mar. 19, 2001. See http://www.gowelding.com/wp/asme4.htm.

Abbas, M., et al.; Code_Aster; Introduction to Code_Aster; User Manual; Booket U1.0-: Introduction to Code_Aster; Document: U1.02.00; Version 7.4; Jul. 22, 2005.

Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) p.; printed Mar. 8, 2012.

Abid, et al., "Numerical simulation to study the effect of tack welds and root gap on welding deformations and residual stresses of a pipe-flange joint" by M. Abid and M. Siddique, Faculty of Mechanical Engineering, GIK Institute of Engineering Sciences and Technology, Topi, NWFP, Pakistan. Available on-line Aug. 25, 2005.

"Penetration in Spot GTA Welds during Centrifugation,"D.K. Aidun and S.A. Martin; Journal of Materials Engineering and Performance vol. 7(5) Oct. 1998—597.

Arc+ simulator; http://www.123arc.com/en/depliant_ang.pdf; 2000, 2 pgs.

ARS Electronica Linz GmbH, Fronius, 2 pages, May 18, 1997.

Asciencetutor.com, A division of Advanced Science and Automation Corp., VWL (Virtual Welding Lab), 2 pages, 2007.

16TH International Shop and Offshore Structures Congress: Aug. 20-25, 2006: Southhampton, UK, vol. 2 Specialist Committee V.3 Fabrication Technology Committee Mandate: T Borzecki, G. Bruce, Y.S. Han, M. Heinemann, A Imakita, L. Josefson, W. Nie, D. Olson, F. Roland, and Y. Takeda.

CS Wave, A Virtual learning tool for welding motion, 10 pages, Mar. 14, 2008.

Choquet, Claude; "ARC+: Today's Virtual Reality Solution for Welders" Internet Page, Jan. 1, 2008.

Code Aster (Software) EDF (France), Oct. 2001.

Cooperative Research Program, Virtual Reality Welder Training, Summary Report SR 0512, 4 pages, Jul. 2005.

Desroches, X.; Code-Aster, Note of use for aclculations of welding; Instruction manual U2.03 booklet: Thermomechanical; Document: U2.03.05; Oct. 1, 2003.

Edison Welding Institute, E-Weld Predictor, 3 pages, 2008.

Eduwelding+, Weld Into the Fugure; Online Welding Seminar—A virtual training environment; 123arc.com; 4 pages, 2005.

Eduwelding+, Training Activities with arc+ simulator; Weld Into The Future, Online Welding Simulator—A virtual training environment; 123arc.com; 6 pages, May 2008.

FH Joanneum, Fronius—virtual welding, 2 pages, May 12, 2008.

The Fabricator, Virtual Welding, 4 pages, Mar. 2008.

Fast, K. et al., "Virtual Training for Welding", Mixed and Augmented Realtity, 2004, ISMAR 2004, Third IEEE and CM International Symposium on Arlington, VA, Nov. 2-5, 2004.

Garcia-Ellende et al., "Defect Detection in Arc-Welding Processes by Means of the Line-to-Continuum Method and Feature Selection", www.mdpi.com/journal/sensors; Sensors 2009, 9, 7753-7770; doi; 10.3390/s91007753.

Juan Vicenete Rosell Gonzales, "RV-Sold: simulator virtual para la formacion de soldadores"; Deformacion Metalica, Es. vol. 34, No. 301 Jan. 1, 2008.

Hillis and Steele, Jr.; "Data Parallel Algorithms", Communications of the ACM, Dec. 1986, vol. 29, No. 12, p. 1170.

"The influence of fluid flow phenomena on the laser beam welding process"; International Journal of Heat and Fluid Flow 23, dated 2002.

The Lincoln Electric Company, CheckPoint Production Monitoring brochure; four pages; http://www.lincolnelectric.com/assets/en_US/products/literature/s232.pdf; Publication S2.32; issue date Feb. 2012.

The Lincoln Electric Company, Production Monitoring brochure, 4 pages, May 2009.

Eric Linholm, John Nickolls, Stuart Oberman, and John Montrym, "Nvidia Testla: A Unifired Graphics and Computing Architecture", IEEE Computer Society, 2008.

Mahrle, A., et al.; "The influence of fluid flow phenomena on the laser beam welding process" International Journal of Heat and Fluid Flow 23 (2002, No. 3, pp. 288.

Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, Apr. 1, 2006, pp. 294-300.

Mechanisms and Mechanical Devices Source Book, Chironis, Neil Sclater; McGraw Hill; 2nd Addition, 1996.

Miller Electric Mgf Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed Mar. 8, 2012.

NSRP ASE, Low-Cost Virtual Reality Welder Training System, 1 Page, 2008.

N. A. Tech., P/NA.3 Process Modeling and Optimization, 11 pages, Jun. 4, 2008.

Virtual Reality Welder Trainer, Sessiion 5: Joining Technologies for Naval Applications: earliest date Jul. 14, 2006 (http://weayback.archive.org) by Nancy C. Porter, Edision Welding Institute; J. Allan Cote, General Dynamics Electric Boat; Timothy D. Gifford, VRSim, and Wim Lam, FCS Controls.

Porter, et al., Virtual Reality Training, Paper No. 2005-P19, 14 pages, 2005.

(56) References Cited

OTHER PUBLICATIONS

Production Monitoring 2 brochure, four pages, The Lincoln Electric Company, May 2009.
Ratnam and Khalid: "Automatic classification of weld defects using simulated data and an MLP neutral network." Insight vol. 49, No. 3; Mar. 2007.
Russel and Norvig, "Artificial Intelligence: A Modern Approach", Prentice-Hall (Copyright 1995).
"Design and Implementation of a Video Sensor for Closed Loop Control of Back Bead Weld Puddle Width," Robert Schoder, Massachusetts Institute of Technology, Dept. of Mechanical Engineering, May 27, 1983.
http://www.sciencedirect.com/science/article/pil/S009457650000151X.
Sim Welder, retrieved on Apr. 12, 2010 from: http://www.simwelder.com.
SIMFOR / CESOL, "RV-Sold" Welding Simulator, Technical and Functional Features, 20 page, no. date available.
Training in a virtual environment gives welding students a leg up, retrieved on Apr. 12, 2010 from: http://www.thefabricator.com/article/arcwelding/virtually-welding.
Wade, "Human uses of ultrasound: ancient and modern", Ultrasonics vol. 38, dated 2000.
Wang et al., "Numerical Analysis of Metal Tranfser in Gas Metal Arc Welding," G. Wang, P.G. Huang, and Y.M. Zhang. Departements of Mechanical and Electrical Engineering. University of Kentucky, Dec. 10, 2001.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
White et al., Virtual welder training, 2009 IEEE Virtual Reality Conference, p. 303, 2009.
*Edison Welding Institue, Inc. And Realweld Systems, Inc.* -v- *Lincoln Global, Inc.*; Complaint for Declaratory Judgement including Exhibits; Civil Action No. 2:12-cv-1040.
*Edison Welding Institue, Inc. and Realweld Systems, Inc.* -v- *Lincoln Global, Inc.*; Stipulated Extension of Time to Answer . . . Civil Action No. 2:12-cv-1040.
*Edison Welding Institue, Inc. and Realweld Systems, Inc.* -v- *Lincoln Global, Inc.*; Corporate Disclosure Statement; Civil Action No. 2:12-cv-1040.
*Edison Welding Institue, Inc. and Realweld Systems, Inc.* -v- *Lincoln Global, Inc.*; Notice of Appearance of Counsel; Civil Action No. 2:12-cv-1040.
*Edison Welding Institue, Inc. and Realweld Systems, Inc.* -v- *Lincoln Global,Inc.*; Unopposed Motion to Dismiss w/o Prejudice including Exhibits; Civil Action No. 2:12-cv-1040.
*Edison Welding Institue, Inc. and Realweld Systems, Inc.* -v- *Lincoln Global, Inc.*; Order Granting Motion; Civil Action No. 2:12-cv-1040.
Edison Welding Institute, Inc.; Docket; Civil Action No. 2:12-cv-1040.
Bender Shipbuilding and Repair Co. Virtual Welding-A Low Cost Virtual Reality Welding Training System. Proposal submitted pursuant to MSRP Advanced Shipbuilding Enterprise Research Announcement, Jan. 23, 2008. 28 pages, See also, http://www.nsrp.org/6-Presentations/WD/020409 Virtual Welding Wilbur.pdf;.
Porter, Nancy; Cote, Allan; Gifford, Timothy; and Lam, Wim. "Virtual Reality Welder Training." The American Welding Society Fabtech International/ AWS Welding Show, Session 5. 29 pages; allegedly Chicago 2005;.
Tschirner, Petra; Hillers, Bernd; and Graser, Axel "A Concept for the Application of Augmented Reality in Manual Gas Metal Arc Welding." Proceedings of the International Symposium on Mixed and Augmented Reality; 2 pages; 2002;.
Penrod, Matt. "New Welder Training Tools." EWI PowerPoint presentation; 16 pages allegedly 2008;.
Echtler, Florian; Sturm, Fabian; Kindermann, Kay; Klinker, Gudrun; Stilla, Joachim; Trilk, Jorn; and Najafi, Hesam. "The Intelligent Welding Gun: Augmented Reality for Experimental Vehicle Construction." Virtual and Augmented Reality Applications in Manufacturing. Eds. Ong, S.K. And Nee, A.Y.C. Springer Verlag. 27 pages. 2003.
Fite-Georgel, Pierre. "Is there a Reality in Industrial Augmented Reality?" 10th IEEE International Symposium on Mixed and Augmented Reality (ISMAR). 10 pages, allegedly 2011.
Aiteanu, Dorian; and Graser, Axel. "Generation and Rendering of a Virtual Welding Seam in an Augmented Reality Training Environment." Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.
Hillers, B.; Graser, A. "Real time Arc-Welding Video Observation System." 62nd International Conference of IIW, Jul. 12-17,2009, 5 pages, allegedly Singapore 2009.
Hillers, B.; Graser, A. "Direct welding arc observation without harsh flicker," 8 pages, allegedly Fabtech International and AWS welding show, 2007.
Advance Program of American Welding Society Programs and Events. Nov. 11-14, 2007. 31 pages. Chicago.
Terebes: examples from http://www.terebes.uni-bremen.de.; 6 pages.
Sandor, Christian; Gudrun Klinker. "Paarti: Development of an Intelligent Welding Gun for BMW." PIA2003, 7 pages, Tokyo. 2003.
Arvika Forum Vorstellung Projekt PAARI. BMW Group Virtual Reality Center. 4 pages. Nuernberg. 2003.
Sandor, Christian; Klinker, Gudrun. "Lessons Learned in Designing Ubiquitous Augmented Reality User Interfaces." 21 pages, allegedly from Emerging Technologies of Augmented Reality: Interfaces Eds. Haller, M.; Billinghurst, M.; Thomas, B. Idea Group Inc. 2006.
Impact Welding: examples from current and archived website, trade shows, etc. See, e.g., http://www.impactwelding.com. 53 pages.
http://www.nsrp.org/6-Presentations/WDVirtual_Welder. pdf (Virtual Reality Welder Training, Project No. S1051, Navy ManTech Program, Project Review for ShipTech 2005); 22 pages. Biloxi, MS.
https://app.aws.org/w/r/www/wj/2005/03/WJ_2005_03.pdf (AWS Welding Journal, Mar. 2005 (see, e.g., p. 54)).; 114 pages.
https://app.aws.org/conferences/defense/live index.html (AWS Welding in the Defense Industry conference schedule, 2004); 12 pages.
https://app.aws.org/wj/2004/04/052/njc (AWS Virtual Reality Program to Train Welders for Shipbuilding, workshop information, 2004); 7 pages.
http://citeseerx.ist.psu.edu/viewdoc/download; jsessionid= E5 B275EI72A9E2 D E2803B9 A5BCA3 E8F8?doi=I 0.1.1.134.8879 &rep=rep1&type=pdf (Virtual Reality Welder Training, Cooperative Research Program Summary report SR0512, Jul. 2005); 4 pages.
https://app.aws.org/wj/2007 /11/WJ200711.pdf (AWS Welding Journal, Nov. 2007); 240 pages.
American Welding Society, "Vision for Welding Industry"; 41 pages.
Energetics, Inc. "Welding Technology Roadmap", Sep. 2000, 38 pages.
Aiteanu, Dorian; and Graser, Axel. "Computer-Aided Manual Welding Using an Augmented Reality Supervisor" Sheet Metal Welding Conference XII, Livonia, MI, May 9-12, 2006, 14 pages.
Hillers, Bernd; Aiteanu, Dorin and Graser, Axel "Augmented Reality—Helmet for the Manual Welding Process" Institute of Automation, University of Bremen, Germany; 21 pages.
Aiteanu, Dorin, Hillers, Bernd and Graser, Axel "A Step Forward in Manual Welding: Demonstration of Augmented Reality Helmet" Institute of Automation, University of Bremen, Germany, Proceedings of the Second IEEE and ACM International Symposium on Mixed and Augmented Reality; 2003; 2 pages.
ArcSentry Weld Quality Monitoring System; Native American Technologies allegedly 2002, 5 pages.
P/NA.3 Process Modelling and Optimization; Native American Technologies, allegedly 2002, 5 pages.
B. Hillers, D. Aitenau, P. Tschimer, M. Park, A. Graser, B. Balazs, L. Schmidt, "Terebes: Welding Helmet with AR Capabilities", Institute of Automatic University Bremen; Institute of Industrial Engineering and Ergonomics, 10 pages, allegedly 2004.

(56) References Cited

OTHER PUBLICATIONS

"Sheet Metal Welding Conference XII", American Welding Society Detroit Section, May 2006, 11 pages.
Kenneth Fast, Timothy Gifford, Robert Yancey, "Virtual Training for Welding", Proceedings of the Third IEEE and ACM International Symposium on Mixed and Augmented Reality (ISMAR 2004); 2 pages.
Claude Choquet, "ARC+®: Today's Virtual Reality Solution for Welders" estimated Jan. 1, 2008, 6 pages.
ARC+ Welding Simulation presentation; 25 pages.
Chuansong Wu, "Microcomputer-based welder training simulator" Computers in Industry 20, 1992, 5 pages.
P. Tschirner et al., "Virtual and Augmented Reality for Quality Improvement of Manual Welds" National Institute of Standards and Technology, Jan. 2002, Publication 973, 24 pages.
Matt Phar, GPU Gems 2 Programming Techniques for High-Performance Graphics and General-Purpose Computation 2005, 12 pages.
Y. Wang et al., "Impingement of Filler Droplets and Weld Pool During Gas Metal Arc Welding Process" International Journal of Heat and Mass Transfer, Sep. 1999, 14 pages.
Larry Jeffus, "Welding Principles and Applications" Sixth Edition, 2008, 10 pages.
R.J. Renwick et al., "Experimental Investigation of GTA Weld Pool Oscillations" Welding Research—Supplement to the Welding Journal, Feb. 1983, 7 pages.
Dorin Aiteanu et al., "Generation and Rendering of a Virtual Welding Seam in an Augmented Reality Training Environment" Proceedings of the Sixth IASTED International Conference, Aug. 2006, 8 pages.
VRSim Inc. "About Us—History" www.vrsim.net/history, 2016, 1 page.
VRSim Powering Virtual Reality, www.lincolnelectric.com/en-us/equipment/training-equipment/Pages/powered-by-vrsim.aspx, 2016, 1 page.
ARC+—Archived Press Release from WayBack Machine from Jan. 31, 2008-Apr. 22, 2013, Page, https://web.archive.org/web/20121006041803/http://www.123certification.com/en/article_press/index.htm, Jan. 21, 2016, 3 pages.
Aidun, Daryush "Influence of Simulated High-g on the Weld Size of Al—Li Alloy" Elevator Sciece Ltd.; Jan. 2001; 4 pages.
ARC Simulation & Certification, Weld Into the Future, 4 pages, Est. Jan. 2005.
International Search Report for PCT/IB2015/000777, dated Dec. 15, 2016; 11 pages.
International Search Report for PCT/IB2015/000814 dated Dec. 15, 2016; 9 pages.
Exhibit B from Declaration of Morgan Lincoln in *Lincoln Electric Co. et al.* v. *Seabery Soluciones, S.L. et al.,* Case No. 1:15-cv-01575-DCN, dated Dec. 20, 2016, 5 pages.
Bryan E. Feldman, James F. O'Brien, Bryan M. Klingner, and Tolga G. Goktekin. Fluids in deforming meshes. In ACM Siggraph/Eurographics Symposium on Computer Animation 2005, Jul. 2005.
Adam W. Bargteil, Tolga G. Goktekin, James F. O'Brien, and John A. Strain. A semi-lagrangian contouring method for fluid simulation. ACM Transactions on Graphics, 25(1), Jan. 2006.
Adam W. Bargteil, Funshing Sin, Jonathan E. Michaels, Tolga G. Goktekin, and James F. O'Brien. A texture synthesis method for liquid animations. In Proceedings of the ACM Siggraph/Eurographics Symposium on Computer Animation, Sep. 2006.
Bryan M. Klingner, Bryan E. Feldman, Nuttapong Chentanez, and James F. O'Brien. Fluid animation with dynamic meshes. In Proceedings of ACM Siggraph 2006, pp. 820-825, Aug. 2006.
Nuttapong Chentanez, Tolga G. Goktekin, Bryan E. Feldman, and James F. O'Brien. Simultaneous coupling of fluids and deformable bodies. In ACM Siggraph/Eurographics Symposium on Computer Animation, pp. 83-89, Aug. 2006.
Nuttapong Chentanez, Bryan E. Feldman, François Labelle, James F. O'Brien, and Jonathan R. Shewchuk. Liquid simulation on lattice-based tetrahedral meshes. In ACM Siggraph/Eurographics Symposium on Computer Animation 2007, pp. 219-228, Aug. 2007.
Pascal Clausen, Martin Wicke, Jonathan R. Shewchuk, and James F. O'Brien. Simulating liquids and solid-liquid interactions with lagrangian meshes. ACM Transactions on Graphics, 32(2):17:1-15, Apr. 2013. Presented at Siggraph 2013.
Kass, M., and Miller, G., "Rapid, Stable Fluid Dynamics for Computer Graphics," Proceedings of Siggraph '90, in Computer Graphics, vol. 24, No. 4, pp. 49-57, Sep. 1990.
Nathan Holmberg and Burkhard C. Wünsche Efficient modeling and rendering of turbulent water over natural terrain. In Proceedings of the 2nd international conference on Computer graphics and interactive techniques in Australasia and South East Asia (Graphite '04), Jun. 2004.
James F. O'Brien and Jessica K Hodgins. "Dynamic Simulation of Splashing Fluids". In Proceedings of Computer Animation 95, pp. 198-205, Apr. 1995.
Nils Thurey, Matthias Müller-Fischer, Simon Schirm, and Markus Gross. Real-time BreakingWaves for Shallow Water Simulations. In Proceedings of the 15th Pacific Conference on Computer Graphics and Applications (PG '07). Oct. 2007.
Nick Foster, Ronald Fedkiw, Practical animation of liquids, Proceedings of the 28th annual conference on Computer graphics and interactive techniques, p. 23-30, Aug. 2001.
N. Rasmussen, D. Enright, D. Nguyen, S. Marino, N. Sumner, W. Geiger, S. Hoon, R. Fedkiw, Directable photorealistic liquids, Proceedings of the 2004 ACM Siggraph/Eurographics symposium on Computer animation, Aug. 27-29, 2004, Grenoble, France.
Bryan E Feldman, James F. O'Brien, and Okan Arikan. "Animating Suspended Particle Explosions". In Proceedings of ACM Siggraph 2003, pp. 708-715, Aug. 2003.
Tolga G. Goktekin, Adam W. Bargteil, and James F. O'Brien. "A Method for Animating Viscoelastic Fluids". ACM Transactions on Graphics (Proc. of ACM Siggraph 2004), 23(3):463-468, Aug. 2004.
Geoffrey Irving, Eran Guendelman, Frank Losasso, Ronald Fedkiw, Efficient simulation of large bodies of water by coupling two and three dimensional techniques, ACM Siggraph 2006 Papers, Jul. 30-Aug. 3, 2006, Boston, Massachusetts.
Bart Adams, Mark Pauly, Richard Keiser, Leonidas J. Guibas, Adaptively sampled particle fluids, ACM Siggraph 2007 papers, Aug. 5-9, 2007, San Diego, California.
Matthias Müller, David Charypar, Markus Gross, Particle-based fluid simulation for interactive applications, Proceedings of the 2003 ACM Siggraph/Eurographics symposium on Computer animation, Jul. 26-27, 2003, San Diego, California.
Premoze, S., Tasdizen, T., Bigler, J., Lefohn, A. E., and Whitaker, R. T. Particle-based simulation of fluids. Comput. Graph. Forum 22, 3, 401-410 Sep. 2003.
Office Action from U.S. Appl. No. 14/526,914 dated Feb. 3, 2017.
International Preliminary Report from PCT/IB2015/001084 dated Jan. 26, 2017.
Sun Yaoming; Application of Micro Computer in Robotic Technologies; Science and Technology Literature Press; Catalogue of New Books of Science and Technology; Sep. 1987, pp. 145-150—CN and English.
Kenneth Fast; Virtual Welding—A Low Cost Virtual Reality Welder system training system phase II; NSRP ASE Technology Investment Agreement; Feb. 29, 2012; pp. 1-54.
The Lincoln Electric Company, CheckPoint Operator's Manual, 188 pages, issue date Aug. 2015.
Nick Foster, Dimitri Metaxas, Realistic animation of liquids, Graphical Models and Image Processing, v.58 n.5, p. 471-483, Sep. 1996.
International Search Report for PCT/IB2014/001796, dated Mar. 24, 3016; 8 pages.
International Search Report for PCT/IB2015/000161, dated Aug. 25, 2016; 9 pages.
Petition for Inter Partes Review of U.S. Pat. No. 8,747,116; IPR 2016-01568; Aug. 9, 2016; 75 pages.
Decision Termination Proceeding of U.S. Pat. No. 8,747,116; IPR 2016-01568; Nov. 15, 2016; 4 pages.
Decision Trial Denied IPR Proceeding of U.S. Pat. No. 8,747,116; IPR 2016-00749; Sep. 21, 2016; 21 pages.

(56) References Cited

OTHER PUBLICATIONS

Decision Denying Request for Rehearing of U.S. Pat. No. RE45398; IPR 2016-00840; Nov. 17, 2016; 10 pages.
Decision Trial Denied IPR Proceeding of U.S. Pat. No. 9,293,056; IPR 2016-00904; Nov. 3, 2016; 15 pages.
Decision Trial Denied IPR Proceeding of U.S. Pat. No. 9,293,057; IPR 2016-00905; Nov. 3, 2016; 21 pages.
Porter, Nancy C.; "Virtual Reality Welder Training," Journal of Ship Production, vol. 22, No. 3, Aug. 2006, pp. 126-138.
William Hoff, Khoi Nguyen, "Computer Vision Based Registration Techniques for Augmented Reality ", Colorado School of Mines, Division of Engineering, Proceedings of Intellectual Robots and Computer Vision XV, pp. 538-548; SPIE vol. 2904, Nov. 18-22, 1996, Boston MA.
Final Written Decision dated Oct. 2, 2017, Case IPR 2016-00840, Patent RE45,398, *Seabery North America Inc.* (Petitioner) vs. *Lincoln Global, Inc.* (Patent Owner), pp. 1-65.
Catalina, Stefanescu, Sen, and Kaukler, "Interaction of Porosity with a Planar Solid/Liquid Interface" ("Catalina"), Metallurgical and Materials Transactions, vol. 35A, May 2004, pp. 1525-1538.
Swantec corporate web page downloaded Apr. 19, 2016. http://www.swantec.com/technology/numerical-simulation/.
Complaint for Patent Infringement in *Lincoln Electric Co. et al.* v. *Seabery Soluciones, S.L. et al.,* Case No. 1:15-cv-01575-DCN, docket No. 1, filed Aug. 10, 2015, in the U.S. District Court for the Northern District of Ohio; 81 pages.
Amended Answer to Complaint with Exhibit A for Patent Infringement filed by Seabery North America Inc. In *Lincoln Electric Co. et al.* v. *Seabery Soluciones, S.L. et al.,* Case No. 1:15-cv-01575-DCN, docket No. 44, filed Mar. 1, 2016, in the U.S. District Court for the Northern District of Ohio; 19 pages.
Amended Answer to Complaint with Exhibit A for Patent Infringement filed by Seabery Soluciones Sl in *Lincoln Electric Co. et al.* v. *Seabery Soluciones, S.L. et al.,* Case No. 1:15-cv-01575-DCN, docket No. 45, filed Mar. 1, 2016, in the U.S. District Court for the Northern District of Ohio; 19 pages.
Reply to Amended Answer to Complaint for Patent Infringement filed by Lincoln Electric Company; Lincoln Global, Inc. In *Lincoln Electric Co. et al.* v. *Seabery Soluciones, S.L. et al.,* Case No. 1:15-cv-01575-DCN; docket No. 46, filed Mar. 22, 2016; 5 pages.
Answer for Patent Infringement filed by Lincoln Electric Company, Lincoln Global, Inc. in *Lincoln Electric Co. et al.* v. *Seabery Soluciones, S.L. et al.,* Case No. 1:15-cv-01575-DCN; docket No. 47, filed Mar. 22, 2016; 5 pages.
Petition for Inter Partes Review of U.S. Pat. No. 8,747,116; IPR 2016-00749; Apr. 7, 2016; 70 pages.
Petition for Inter Partes Review of U.S. Pat. No. RE45,398; IPR 2016-00840; Apr. 18, 2016; 71 pages.
Petition for Inter Partes Review of U.S. Pat. No. 9,293,056; IPR 2016-00904; May 9, 2016; 91 pages.
Petition for Inter Partes Review of U.S. Pat. No. 9,293,057; IPR 2016-00905; May 9, 2016; 87 pages.
Declaration of Dr. Michael Zyda, May 3, 2016, exhibit to IPR 2016-00749.
Declaration of Edward Bohnart, Apr. 27, 2016, exhibit to IPR 2016-00749.
Declaration of Dr. Michael Zyda, May 3, 2016, exhibit to IPR 2016-00905; 72 pages.
Declaration of Edward Bohnart, Apr. 27, 2016, exhibit to IPR 2016-00905; 23 pages.
Declaration of Dr. Michael Zyda, May 3, 2016, exhibit to IPR 2016-00904; 76 pages.
Declaration of Edward Bohnart, Apr. 27, 2016, exhibit to IPR 2016-00904; 22 pages.
Declaration of AxelGraeser, Apr. 17, 2016, exhibit to IPR 2016-00840; 88 pages.
SIMFOR / CESOL, "RV-SOLD" Welding Simulator, Technical and Functional Features, 20 pages, estimated Jan. 2010.
Teeravarunyou et al, "Computer Based Welding Training System," International Journal of Industrial Engineering (2009) 16(2): 116-125.
Antonelli et al, "A Semi-Automated Welding Station Exploiting Human-Robot Interaction," Advanced Manufacturing Systems and Technology (2011) pp. 249-260.
Praxair Technology Inc, "The RealWeld Trainer System: Real Weld Training Under Real Conditions" Brochure (2013) 2 pages.
United States Provisional Patent Application for "System for Characterizing Manual Welding Operations on Pipe and Other Curved Structures," Prov. U.S. Appl. No. 62/055,724, filed Sep. 26, 2014, 35 pages.
Lincoln Global, Inc., "VRTEX 360: Virtual Reality Arc Welding Trainer" Brochure (2015) 4 pages.
J.Y. (Yosh) Mantinband, Hillel Goldenberg, Llan Kleinberger, Paul Kleinberger, Autosteroscopic, field-sequential display with full freedom of movement OR Let the display were the shutter-glasses, 3ality (Israel) Ltd., 8 pages, 2002.
Kobayashi, Ishigame, and Kato, "Simulator of Manual Metal Arc Welding with Haptic Display" ("Kobayashi 2001"), Proc. of the 11th International Conf. on Artificial Reality and Telexistence (ICAT), Dec. 5-7, 2001, pp. 175-178, Tokyo, Japan.
Wahi, Maxwell, and Reaugh, "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.
Nuhan Onew Technology Co Ltd, "ONEW-360 Welding Training Simulator" http://en.onewtech.com/_d276479751.htm as accessed on Jul. 10, 2015, 12 pages.
The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.
Miller Electric Mfg Co, "LiveArc: Welding Performance Management System" Owner's Manual, (Jul. 2014) 64 pages.
Miller Electric Mfg Co, "LiveArc Welding Performance Management System" Brochure, (Dec. 2014) 4 pages.
Kobayashi, Ishigame, and Kato, "Skill Training System of Manual Arc Welding by Means of Face-Shield-Like HMD and Virtual Electrode" ("Kobayashi 2003"), Entertainment Computing, vol. 112 of the International Federation for Information Processing (IFIP), Springer Science + Business Media, New York, copyright 2003, pp. 389-396.
G.E. Moore, "No exponential is forever: but 'Forever' can be delayed!," IEEE International Solid-State Circuits Conference, 2003. 19 pages.
"High Performance Computer Architectures_ A Historical Perspective," downloaded May 5, 2016. http://homepages.inf.ed.ac.uk/cgi/mi/comparch. pl?Paru/perf.html,Paru/perf-f.html,Paru/menu-76.html; 3 pages.
Andreas Grahn, "Interactive Simulation of Contrast Fluid using Smoothed Particle Hydrodynamics," Jan. 1, 2008, Master's Thesis in Computing Science, Umeå University, Department of Computing Science, Umeå, Sweden; 69 pages.
Marcus Vesterlund, "Simulation and Rendering of a Viscous Fluid using Smoothed Particle Hydrodynamics," Dec. 3, 2004, Master's Thesis in Computing Science, Umeå University, Department of Computing Science, Umeå, Sweden; 46 pages.
M. Müller, et al., "Point Based Animation of Elastic, Plastic and Melting Objects," Eurographics/ACM Siggraph Symposium on Computer Animation (2004); 11 pages.
Andrew Nealen, "Point-Based Animation of Elastic, Plastic, and Melting Objects," CG topics, Feb. 2005; 2 pages.
D. Tonnesen, Modeling Liquids and Solids using Thermal Particles, Proceedings of Graphics Interface'91, pp. 255-262, Calgary, Alberta, 1991.
"CUDA Programming Guide Version 1.1," Nov. 29, 2007. 143 pages.
Webster's II new college dictionary, 3rd ed., Houghton Mifflin Co., copyright 2005, Boston, MA, p. 1271, definition of "wake." 3 pages.
Da Dalto L, et al. "CS Wave: Learning welding motion in a virtual environment" Published in Proceedings of the IIW International Conference, Jul. 10-11, 2008; 19 pages.

(56) References Cited

OTHER PUBLICATIONS

CS Wave-Manual, "Virtual Welding Workbench User Manual 3.0" 2007; 25 pages.
Choquet, Claude. "ARC+®: Today's Virtual Reality Solution for Welders", Published in Proceedings of the IIW Internatioal Conference; Jul. 10-11, 2008; 19 pages.
Welding Handbook, Welding Science & Technology, American Welding Society, Ninth Ed., Copyright 2001. Appendix A "Terms and Definitions" 54 pages.
Virtual Welding: A Low Cost Virtual Reality Welder Training System, NSRP RA 07-01—BRP Oral Review Meeting in Charleston, SC at ATI, Mar. 2008; 6 pages.
Dorin Aiteanu "Virtual and Augmented Reality Supervisor for a New Welding Helmet" Dissertation Nov. 15, 2005; 154 pages.
"The Evolution of Computer Graphics," Tony Tamasi, NVIDIA, 2008; 36 pages.
ViziTech USA, retrieved on Mar. 27, 2014 from http://vizitechusa.com/, 2 pages.
Guu and Rokhlin, Technique for Simultaneous Real-Time Measurements of Weld Pool Surface Geometry and Arc Force, 10 pages, Dec. 1992.
S.B. Chen, L. Wu, Q. L. Wang and Y. C. Liu, Self-Learning Fuzzy Neural Networks and Computer Vision for Control of Pulsed GTAW, 9 pages, dated May 1997.
Patrick Rodjito, Position tracking and motion prediction using Fuzzy Logic, 81 pages, 2006, Colby College.
D'Huart, Deat, and Lium; Virtual Environment for Training, 6th International Conference, ITS 20002, 6 pages, Jun. 2002.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
ANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.
M. Jonsson, L. Karlsson, and L-E Lindgren, Simulation of Tack Welding Procedures in Butt Joint Welding of Plate Welding Research Supplement, Oct. 1985, 7 pages.
Isaac Brana Veiga, Simulation of a Work Cell in the IGRIP Program, dated 2006, 50 pages.
Balijepalli, A. and Kesavadas, Haptic Interfaces for Virtual Environment and Teleoperator Systems, Haptics 2003, 7-., Department of Mechanical & Aerospace Engineering, State University of New York at Buffalo, NY.
Johannes Hirche, Alexander Ehlert, Stefan Guthe, Michael Doggett, Hardware Accelerated Per-Pixel Displacement Mapping, 8 pages.
Yao et al., 'Development of a Robot System for Pipe Welding'. 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112, 4 pages.
Steve Mann, Raymond Chun Bing Lo, Kalin Ovtcharov, Shixiang Gu, David Dai, Calvin Ngan, Tao Al, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE), pp. 1-6, 6 pages, Apr. 29, 2012.
Kyt Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/, 1 page, retrieved on Sep. 26, 2014.
Terrence O'Brien, "Google's Project Glass gets some more details", Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.
William T. Reeves, "Particles Systems—A Technique for Modeling a Class of Fuzzy Objects", Computer Graphics 17:3 pp. 359-3761983.
Fletcher Yoder Opinion re RE45398 and U.S. Appl. No. 14/589,317; including appendices; Sep. 9, 2015; 1700 pages.
Screen Shot of CS Wave Exercise 135.FWPG Root Pass Level 1 https://web.archive.org/web/20081128081858/http:/wave_c-sfr/images/english/snap_evolution2.jpg; 1 page.
Screen Shot of CS Wave Control Centre V3.0.0 https://web.archive.org/web/20081128081915/http:/wave.c-s.fr/images/english/snap_evolution4.jpg; 1 page.
Screen Shot of CS Wave Control Centre V3.0.0 https://web.archive.org/web/20081128081817/http:/wave.c-s.fr/images/english/snap_evolution6.jpg; 1 page.
Da Dalto L, et al. "CS Wave a Virtual learning tool for the welding motion," Mar. 14, 2008; 10 pages.
Nordruch, Stefan, et al. "Visual Online Monitoring of PGMAW Without a Lighting Unit", Jan. 2005; 14 pages.
ChemWeb.com—Journal of Materials Engineering (printed Sep. 26, 2012) (01928041).
Heat and mass transfer in gas metal arc welding. Part 1: the arc by J. Hu, and Hi Tsai found in ScienceDirect, International Journal of Heat and Mass transfer 50 (2007) 833-846 Available on Line on Oct. 24, 2006 http://web.mst/edu/~tsai/publications/Hu-IJHMT-2007-1-60.pdf.
Texture Mapping by. Ian Graham, Carnegie Mellon University Class 15-462 Computer graphics, Lecture 10 dated Feb. 13, 2003.
Nancy C. Porter, J. Allan Cote, Timothy D. Gifford, and Wim Lam, Virtual Reality Welder Training, dated Jul. 14, 2006.
European Examination Report for application No. 17001820.4, 4 pp., dated May 16, 2019.
Yizhong Wang, Younghua Chen, Zhongliang Nan, Yong Hu, Study on Welder Training by Means of Haptic Guidance and Virtual Reality for Arc Welding, 2006 IEEE International Conference on Robotics and Biomimetrics, pp. 954-958, ROBIO 2006 ISBN-10:1424405718, Dec. 17-20, 2006, Kunming, China.
Nancy C. Porter, J. Allan Cote, Timothy D. Gifford, Wim Lan, Virtual Reality Welder Training, Paper No. 2005-P19, 2005, pp. 1-14.
Asciencetutor.Com, A Division of Advanced Science and Automation Corp., VWL (Virtual Welding Lab), 2007, 2 pages.
Edison Welding Institute, E-Weld Predictor, 3 pages, 2008, Columbus, OH.
Tim Heston, Virtually welding, The Fabricator, Mar. 2008, 4 pages.
FMA Communications Inc., Rockford, IL, www.thefabricator.com.
NSRP ASE, Low-Cost Virtual Reality Welder Training System, 2008, 1 page.
Steven White, Mores Prachyabrued, Dhruva Baghi, Amit Aglawe, Dirk Reiners, Christoph Borst, Terry Chambers, Virtual Welder Trainer, IEEE Virtual Reality 2009, p. 303.
Nancy Porter, J. Allan Cote, Timothy Gifford, Virtual Reality Welder Training, CRP Cooperative Research Program, Summary Report SR 0512, Jul. 2005, 4 pages.
Weld Into the Future, Eduwelding+, Training Activities with arc+ simulator, 2005, 4 pages.
Claude Choquet, ARC+: Today's Virtual Reality Solution for Welders, 123 Certification In.,Montreal, Quebec, CA, May 2008, 6 pages.
Laurent Da Dalto, Dominique Steib, Daniel Mellet-d'Huart, Olivier Balet, CS WAVE A Virtual learning tool for the welding motion, http://www,c-s.fr, Mar. 14, 2008, 10 pages.
CS WAVE, The Virtual Welding Trainer, 6 pages, 2007.
Fronius—virtual welding, www.fh-joanneum.at/ca/cn/yly/?lan=en, 2 pages, May 12, 2008.
Fronius, ARS Electronica, 2 pages, May 18, 1997.
P/NA.3 Process Modelling and Optimization, www.natech-inc.com/pna3/index.html, 11 pages, Jun. 4, 2008.
"RV-Sold" Welding Simulator Technical and Functional Features, SIMFOR, pp. 1-20, date unknown.
Juan Vicente Rosell, RV-Sold: Simulador virtual para la formacion de soldadores, Deformacion Metalica, Es. vol. 34, No. 301, 14 pages, Jan. 1, 2008.
Kenneth Fast, Timothy Gifford, Robert Yancy, Virtual Training for Welding, 3rd IEEE and ACM International symposium on Mixed and Augmented Reality (ISMAR 2004), 2 pages, 2004.

(56) References Cited

OTHER PUBLICATIONS

D. Mavrikios, V. Karabatsou, D. Fragos, G. Chryssolouris, A proto-type virtual reality-0cased demonstrator for immersive and interactive simulation of welding processes, International Journal of Computer Integrated Manufacturing, 294-301, 2006.
PCT/IB2009/00605 International Search Report.
PCT/IB2009/00605 Written Opinion.
U.S. Appl. No. 29/399,980, filed Jul. 10, 2009, issued May 11, 2010 as D615,573.
U.S. Appl. No. 29/339,979, filed Jul. 10, 2009, issued Apr. 20, 2010 as D614,217.
U.S. Appl. No. 29/339,978, filed Jul. 10, 2009.
U.S. Appl. No. 12/504,870, filed Jul. 17, 2009 claiming priority to U.S. Appl. No. 61/090,794.
U.S. Appl. No. 12/501,263, filed Jul. 10, 2009 claiming priority to U.S. Appl. No. 61/090,794.
U.S. Appl. No. 12/501,257, filed Jul. 10, 2009 claiming priority to U.S. Appl. No. 61/090,764.

* cited by examiner

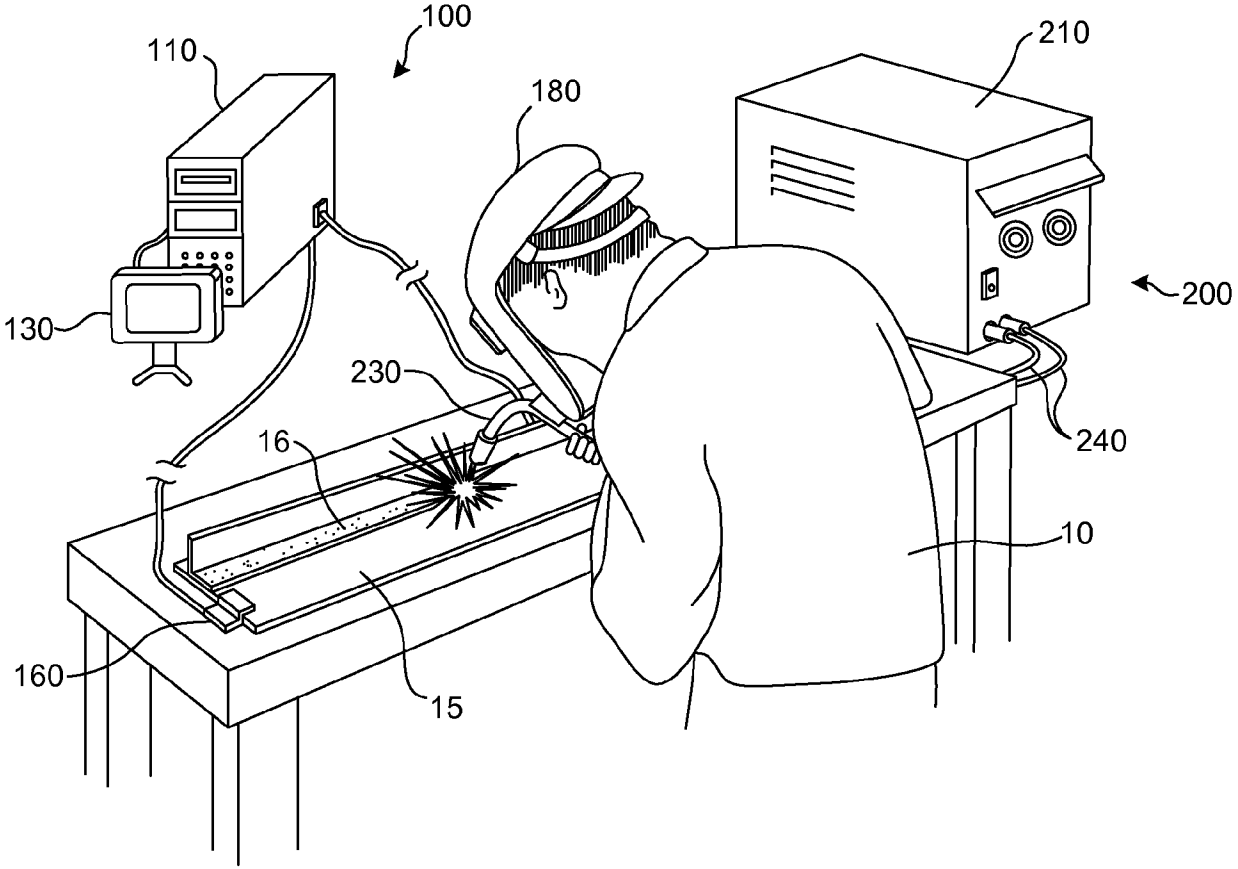
*FIG. 1*
AMENDED

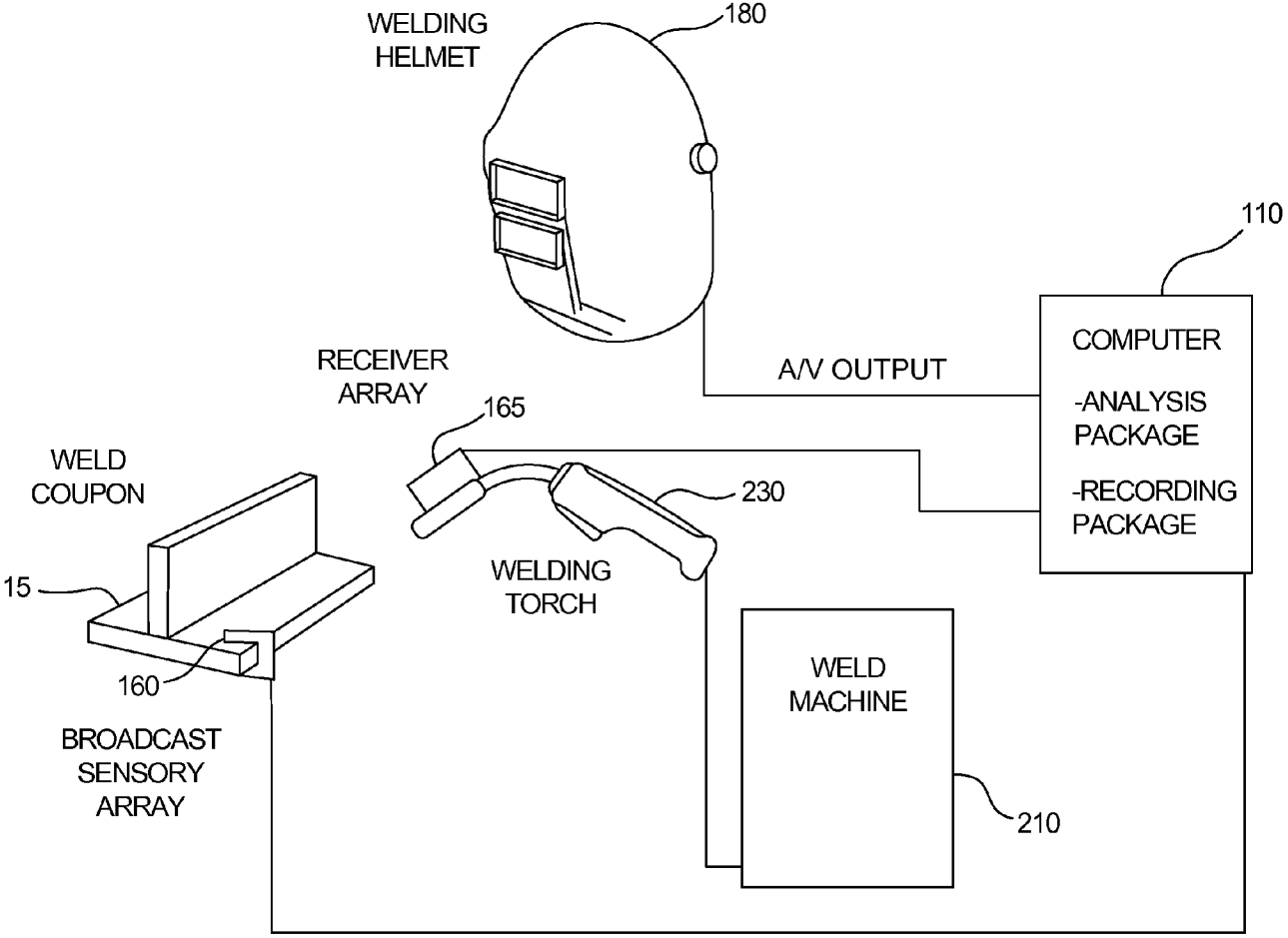
*FIG. 2*
AMENDED

SYSTEM FOR TRACKING AND ANALYZING WELDING ACTIVITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 8,274,013. This application is for reissue of U.S. Pat. No. 8,274,013, and is a continuation reissue of application Ser. No. 14/177,692, which is an application for reissue of U.S. Pat. No. 8,274,013, which claims priority to and the benefit of U.S. provisional patent application No. 61/158,578 filed Mar. 9, 2009, and which is incorporated herein by reference in its entirety.*

This U.S. patent application claims priority to and the benefit of U.S. provisional patent application Ser. No. 61/158,578 which was filed on Mar. 9, 2009, and which is incorporated herein by reference in its entirety.

TECHNICAL FIELD

Certain embodiments of the present invention pertain to systems for tracking and analyzing welding activity, and more particularly, to systems that capture weld data in real time (or near real time) for analysis and review. Additionally, the embodiments of the present invention provide a system for marking portions of a welded article by indicating possible discontinuities or flaws within the weld joint.

BACKGROUND

In many applications, ascertaining the quality of weld joints is critical to the use and operation of a machine or structure incorporating a welded article. In some instances, x-raying or other nondestructive testing is needed to identify potential flaws within one or more welded joints. However, non-destructive testing can be cumbersome to use, and typically lags the welding process until the inspector arrives to complete the testing. Additionally, it may not be effective for use with all weld joint configurations. Moreover, non-destructive testing does not provide any information about how the weld was completed. In welding applications where identifying waste is vital to producing cost effective parts, non-destructive testing provides no insight into problems like overfill.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

The embodiments of the present invention pertain to a system for tracking and analyzing welding activity. The system may be used in conjunction with a welding power supply and includes a sensor array and logic processor-based technology that captures performance data (dynamic spatial properties) as the welder performs various welding activities. The system functions to evaluate the data via an analysis engine for determining weld quality in real time (or near real time). The system also functions to store and replay data for review at a time subsequent to the welding activity thereby allowing other users of the system to review the performance activity of the welding process.

These and other novel features of the subject matter of the present application, as well as details of illustrated embodiments thereof, will be more fully understood from the following description and drawings.

BRIEF DESCRIPTION OF THE DRAWINGS

FIG. 1 is a perspective view of a welder using an embodiment of a system for tracking and analyzing welding activity;

FIG. 2 is a schematic representation of an embodiment of the system of FIG. 1 for tracking and analyzing welding activity;

DETAILED DESCRIPTION

Figure 3:
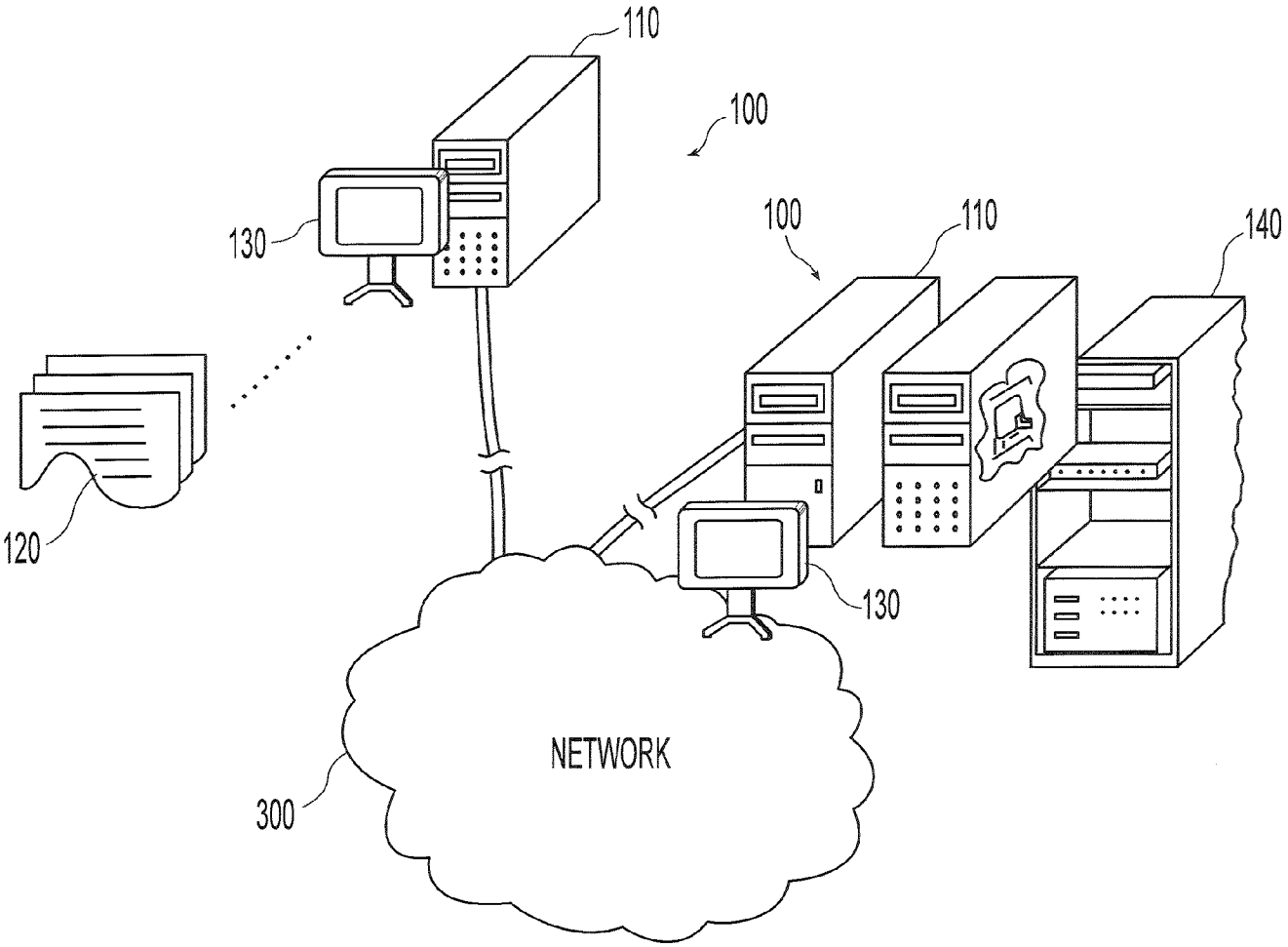
FIG. 3 is a schematic representation of an embodiment of the hardware and software of the system of FIGS. 1-2 for tracking and analyzing welding activity.
Figure 4:
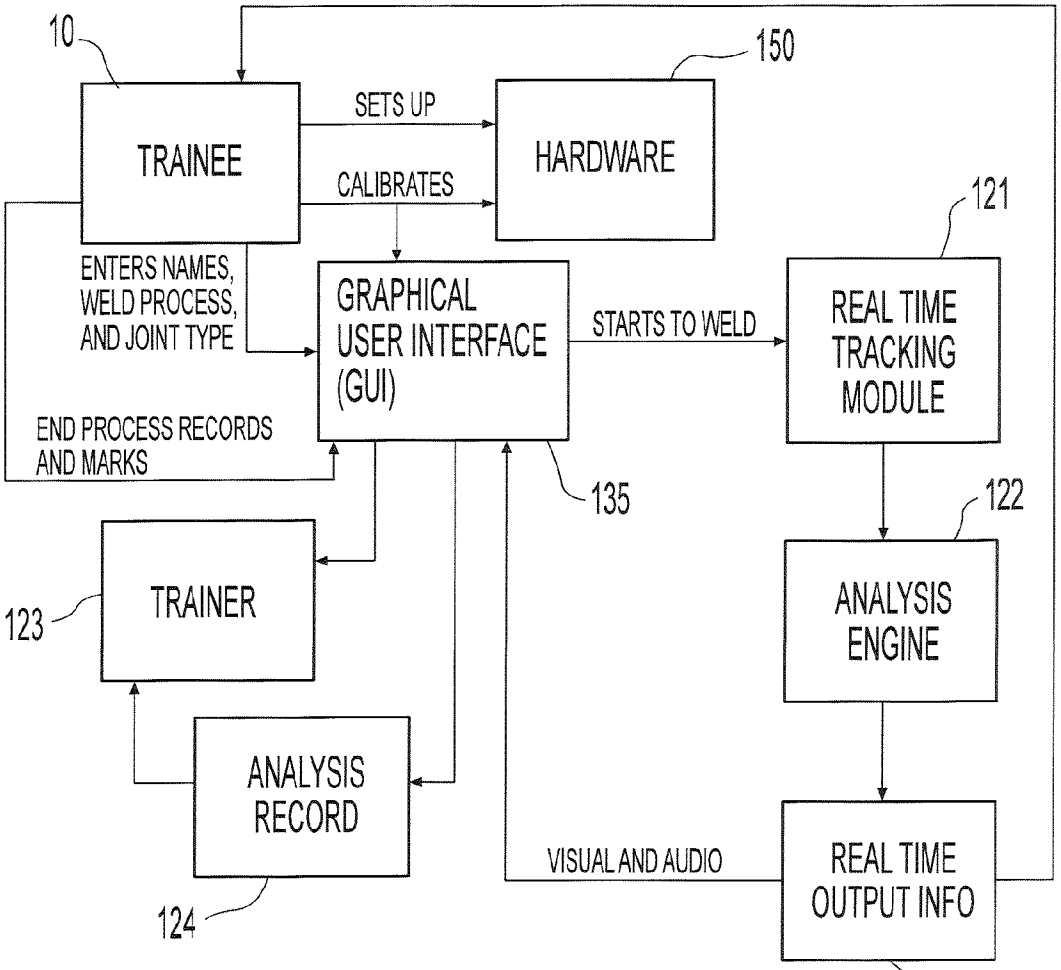
FIG. 4 is a flow diagram of an embodiment of the system of FIGS. 1-3 for tracking and analyzing welding activity.
Figure 5:
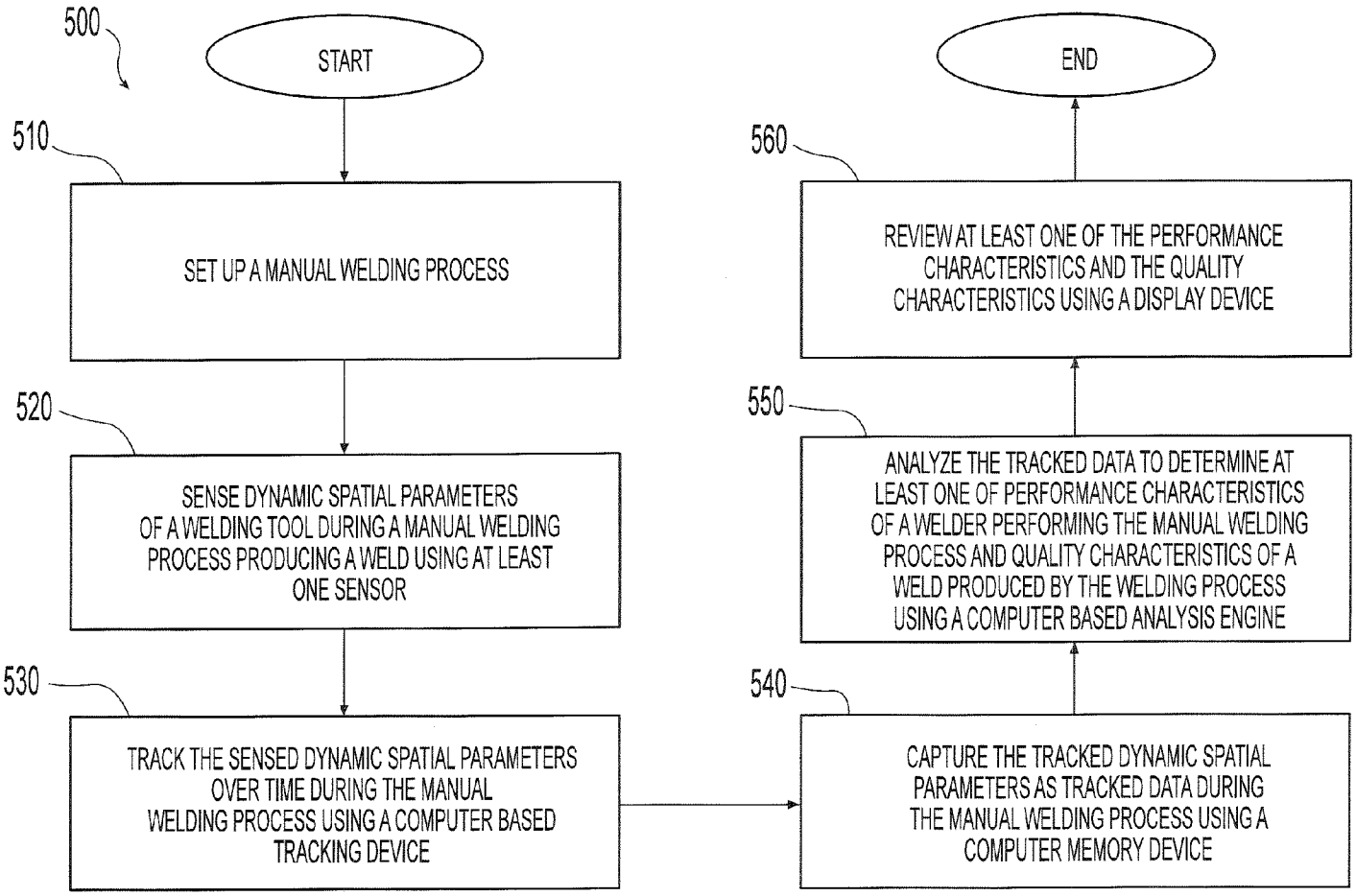
FIG. 5 is a flowchart of an embodiment of a method for tracking and analyzing welding activity using the system of FIGS. 1-4.

FIG. 1 is a perspective view of a welder 10 using an embodiment of a system 100 for tracking and analyzing welding activity while performing a welding process with a welding system 200. FIG. 2 is a schematic representation of an embodiment of the system 100 of FIG. 1 for tracking and analyzing welding activity. FIG. 3 is a schematic representation of an embodiment of the hardware 110, 130 and software 120 of the system 100 of FIGS. 1-2 for tracking and analyzing welding activity. FIG. 4 is a flow diagram of an embodiment of the system 100 of FIGS. 1-3 for tracking and analyzing welding activity. FIG. 5 is a flowchart of an embodiment of a method 500 for tracking and analyzing welding activity using the system 100 of FIGS. 1-4.

Referring again to the drawings wherein the showings are for purposes of illustrating embodiments of the invention only and not for purposes of limiting the same, FIG. 1 shows a system 100 for tracking and analyzing manual processes requiring the dexterity of a human end user 10. In particular, system 100 functions to capture performance data related to the use and handling of tools (e.g., welding tools). In one embodiment, the system 100 is used to track and analyze welding activity, which may be a manual welding process in any of its forms including but not limited to: arc welding, laser welding, brazing, soldering, oxyacetylene and gas welding, and the like. For illustrative purposes, the embodiments of the present invention will be described in the context of arc welding. However, persons of ordinary skill in the art will understand its application to other manual processes. In accordance with alternative embodiments of the present invention, the manual welder 10 may be replaced with a robotic welder. As such, the performance of the robotic welder and resultant weld quality may be determined in a similar manner.

In one embodiment, the system 100 tracks movement or motion (i.e., position and orientation over time) of a welding tool 230, which may be, for example, an electrode holder or a welding torch. Accordingly, the system 100 is used in conjunction with a welding system 200 including a welding power supply 210, a welding torch 230, and welding cables 240, along with other welding equipment and accessories. As a welder 10, i.e. end user 10, performs welding activity in accordance with a welding process, the system 100 functions to capture performance data from real world welding activity as sensed by sensors 160, 165 (see FIG. 2) which are discussed in more detail later herein.

In accordance with an embodiment of the present invention, the system 100 for tracking and analyzing welding activity includes the capability to automatically sense dynamic spatial properties (e.g., positions, orientations, and movements) of a welding tool 230 during a manual welding process producing a weld 16 (e.g., a weld joint). The system 100 further includes the capability to automatically track the sensed dynamic spatial properties of the welding tool 230 over time and automatically capture (e.g., electronically capture) the tracked dynamic spatial properties of the welding tool 230 during the manual welding process.

The system 100 also includes the capability to automatically analyze the tracked data to determine performance characteristics of a welder 10 performing the manual welding process and quality characteristics of a weld 16 produced by the welding process. The system 100 allows for the performance characteristics of the welder 10 and the quality characteristics of the weld to be reviewed. The performance characteristics of a welder 10 may include, for example, a weld joint trajectory, a travel speed of the welding tool 230, welding tool pitch and roll angles, an electrode distance to a center weld joint, an electrode trajectory, and a weld time. The quality characteristics of a weld produced by the welding process may include, for example, discontinuities and flaws within certain regions of a weld produced by the welding process.

The system 100 further allows a user (e.g., a welder 10) to locally interact with the system 100. In accordance with another embodiment of the present invention, the system 100 allows a remotely located user to remotely interact with the system 100. In either scenario, the system 100 may automatically authorize access to a user of the system 100, assuming such authorization is warranted.

In accordance with an embodiment of the present invention, the system 100 for tracking and analyzing welding activity includes a processor based computing device 110 configured to track and analyze dynamic spatial properties (e.g., positions, orientations, and movements) of a welding tool 230 over time during a manual welding process producing a weld 16. The system 100 further includes at least one sensor array 160, 165 operatively interfacing to the processor based computing device 110 (wired or wirelessly) and configured to sense the dynamic spatial properties of a welding tool 230 during a manual welding process producing a weld 16. The system 100 also includes at least one user interface operatively interfacing to the processor based computing device 110. The user interface may include a graphical user interface 135 and/or a display device (e.g., a display 130 or a welding display helmet 180 where a display is integrated into a welding helmet as illustrated in FIG. 2). The system 100 may further include a network interface configured to interface the processor based computing device 110 to a communication network 300 (e.g., the internet).

In accordance with an embodiment of the present invention, a method 500 (see FIG. 5) for tracking and analyzing welding activity includes, in step 510, setting up a manual welding process, and, in step 520, sensing dynamic spatial properties (e.g., positions, orientations, and movements) of a welding tool 230 during a manual welding process producing a weld using at least one sensor (e.g., sensor arrays 160 and 165). In step 530, the method includes tracking the sensed dynamic spatial properties over time during the manual welding process using a real time tracking module 121 (see FIG. 4). The method also includes, in step 540, capturing the tracked dynamic spatial properties as tracked data during the manual welding process using a computer based (e.g., electronic) memory device (e.g., a portion of the hardware 150 and software 120 of the processor based computing device 110). The method further includes, in step 550, analyzing the tracked data to determine performance characteristics of a welder 10 performing the manual welding process and/or quality characteristics of a weld produced by the welding process using a computer based analysis engine 122. In step 560, at least one of the performance characteristics and the quality characteristics are reviewed using a display device (e.g., display device 130). Alternatively, a visualization module or a testing module may be used in place of the display device 130, as are well known in the art.

The method 500 may initially include selecting welding set up parameters for the welding process via a user interface 135 as part of step 510. The method may also include outputting the performance characteristics of the welder 10 and/or the quality characteristics of a weld to a remote location and remotely viewing the performance characteristics and/or the quality characteristics via a communication network 300 (see FIG. 3).

The system 100 for tracking and analyzing welding activity comprises hardware and software components, in accordance with an embodiment of the present invention. In one embodiment, the system 100 incorporates electronic hardware. More specifically, system 100 may be constructed, at least in part, from electronic hardware 150 (see FIG. 4) of the processor based computing device 110 operable to execute programmed algorithms, also referred to herein as software 120 or a computer program product. The processor based computing device 110 may employ one or more logic processors capable of being programmed, an example of which may include one or more microprocessors. However, other types of programmable circuitry may be used without departing from the intended scope of coverage of the embodiments of the present invention. In one embodiment, the processor based computing device 110 is operatively disposed as a microcomputer in any of various configurations including but not limited to: a laptop computer, a desktop computer, a work station, a server or the like. Alternatively, mini-computers or main frame computers may serve as the platform for implementing the system 100 for tracking and analyzing welding activity. Moreover, handheld or mobile processor based computing devices may be used to execute programmable code for tracking and analyzing performance data.

Other embodiments are contemplated wherein the system 100 is incorporated into the welding system 200. More specifically, the components comprising the system 100 may be integrated into the welding power supply 210 and/or weld torch 230. For example, the processor based computing device 110 may be received internal to the housing of the welding power supply 210 and may share a common power supply with other systems located therein. Additionally, sensors 160, 165, used to sense the weld torch 230 dynamic spatial properties, may be integrated into the weld torch handle.

The system 100 may communicate with and be used in conjunction with other similarly or dissimilarly constructed systems. Input to and output from the system 100, termed I/O, may be facilitated by networking hardware and software including wireless as well as hard wired (directly connected) network interface devices. Communication to and from the system 100 may be accomplished remotely as through a network 300 (see FIG. 3), such as, for example, a wide area network (WAN) or the Internet, or through a local area network (LAN) via network hubs, repeaters, or by any means chosen with sound engineering judgment. In this manner, information may be transmitted between systems as is useful for analyzing, and/or re-constructing and displaying performance and quality data.

In one embodiment, remote communications are used to provide virtual instruction by personnel, i.e. remote or offsite users, not located at the welding site. Reconstruction of the welding process is accomplished via networking. Data representing a particular weld may be sent to another similar or dissimilar system 100 capable of displaying the weld data (see FIG. 3). It should be noted that the transmitted data is sufficiently detailed for allowing remote user(s) to analyze the welder's performance and the resultant weld quality. Data sent to a remote system 100 may be used to generate a virtual welding environment thereby recreating the welding process as viewed by offsite users as discussed later herein. Still, any way of communicating performance data to another entity remotely located from the welding site may be used without departing from the intended scope of coverage of the embodiments of the subject invention.

The processor based computing device 110 further includes support circuitry including electronic memory devices, along with other peripheral support circuitry that facilitate operation of the one or more logic processor(s), in accordance with an embodiment of the present invention. Additionally, the processor based computing device 110 may include data storage, examples of which include hard disk drives, optical storage devices and/or flash memory for the storage and retrieval of data. Still any type of support circuitry may be used with the one or more logic processors as chosen with sound engineering judgment. Accordingly, the processor based computing device 110 may be programmable and operable to execute coded instructions in a high or low level programming language. It should be noted that any form of programming or type of programming language may be used to code algorithms as executed by the system 100.

With reference now to FIGS. 1-4, the system 100 is accessible by the end user 10 via a display screen 130 operatively connected to the processor based computing device 110. Software 120 installed onto the system 100 directs the end user's 10 interaction with the system 100 by displaying instructions and/or menu options on, for example, the display screen 130 via one or more graphical user interfaces (GUI) 135. Interaction with the system 100 includes functions relating to, for example: part set up (weld joint set up), welding activity analysis, weld activity playback, real time tracking, as well as administrative activity for managing the captured data. Still other functions may be chosen as are appropriate for use with the embodiments of the present invention. System navigation screens, i.e. menu screens, may be included to assist the end user 10 in traversing through the system functions. It is noted that as the system 100 is used for training and analysis, security may be incorporated into the GUI(s) 135 that allow restricted access to various groups of end users 10. Password security, biometrics, work card arrangement or other security measures may be used to ensure that system access is given only to authorized users as determined by an administrator or administrative user. It will be appreciated that the end user 10 may be the same or a different person than that of the administrative user.

In one embodiment, the system 100 functions to capture performance data of the end user 10 for manual activity as related to the use of tools or hand held devices. In the accompanying figures, welding, and more specifically, arc welding is illustrated as performed by the end user 10 on a weldment 15 (e.g., a weld coupon). The welding activity is recorded by the system 100 in real time or near-real time for tracking and analysis purposes mentioned above by a real time tracking module 121 and an analysis module 122, respectively (see FIG. 4). By recorded it is meant that the system 10 captures data related to a particular welding process for determining the quality of the weld joint or weld joints. The types of performance data that may be captured include, but are not limited to, for example: weld joint configuration or weld joint trajectory, weld speed, welding torch pitch and roll angles, electrode distance to the center weld joint, wire feed speed, electrode trajectory, weld time, and time and date data. Other types of data may also be captured and/or entered into the system 100 including: weldment materials, electrode materials, user name, project ID number, and the like. Still, any type and quantity of information may be captured and/or entered into the system 100 as is suitable for tracking, analyzing and managing weld performance data. In this manner, detailed information about how the welding process for a particular weld joint was performed may be captured and reconstructed for review and analysis in an analysis record 124.

The data captured and entered into the system 100 is used to determine the quality of the real world weld joint. Persons of ordinary skill in the art will understand that a weld joint may be analyzed by various processes including destructive and non-destructive methods, examples of which include sawing/cutting or x-raying of the weld joint respectively. In prior art methods such as these, trained or experienced weld personnel can determine the quality of a weld performed on a weld joint. Of course, destructive testing renders the weldment unusable and thus can only be used for a sampling or a subset of welded parts. While non-destructive testing, like x-raying, do not destroy the welded article, these methods can be cumbersome to use and the equipment expensive to purchase. Moreover, some weld joints cannot be appropriately x-rayed, i.e. completely or thoroughly x-rayed. By way of contrast, system 100 captures performance data during the welding process that can be used to determine the quality of the welded joint. More specifically, system 100 is used to identify potential discontinuities and flaws within specific regions of a weld joint. The captured data may be analyzed by an experienced welder or trained professional (e.g., a trainer 123, see FIG. 4), or in an alternative by the system 100 using the analysis module 122 for identifying areas within the weld joint that may be flawed. In one example, torch position and orientation along with travel speed and other critical parameters are analyzed as a whole to predict which areas along the weld joint, if any, are deficient. It will be understood that quality is achieved during the welding process when the operator 10 keeps the weld torch 230 within acceptable operational ranges. Accordingly, the performance data may be analyzed against known good parameters for achieving weld quality for a particular weld joint configuration.

Figure 6:
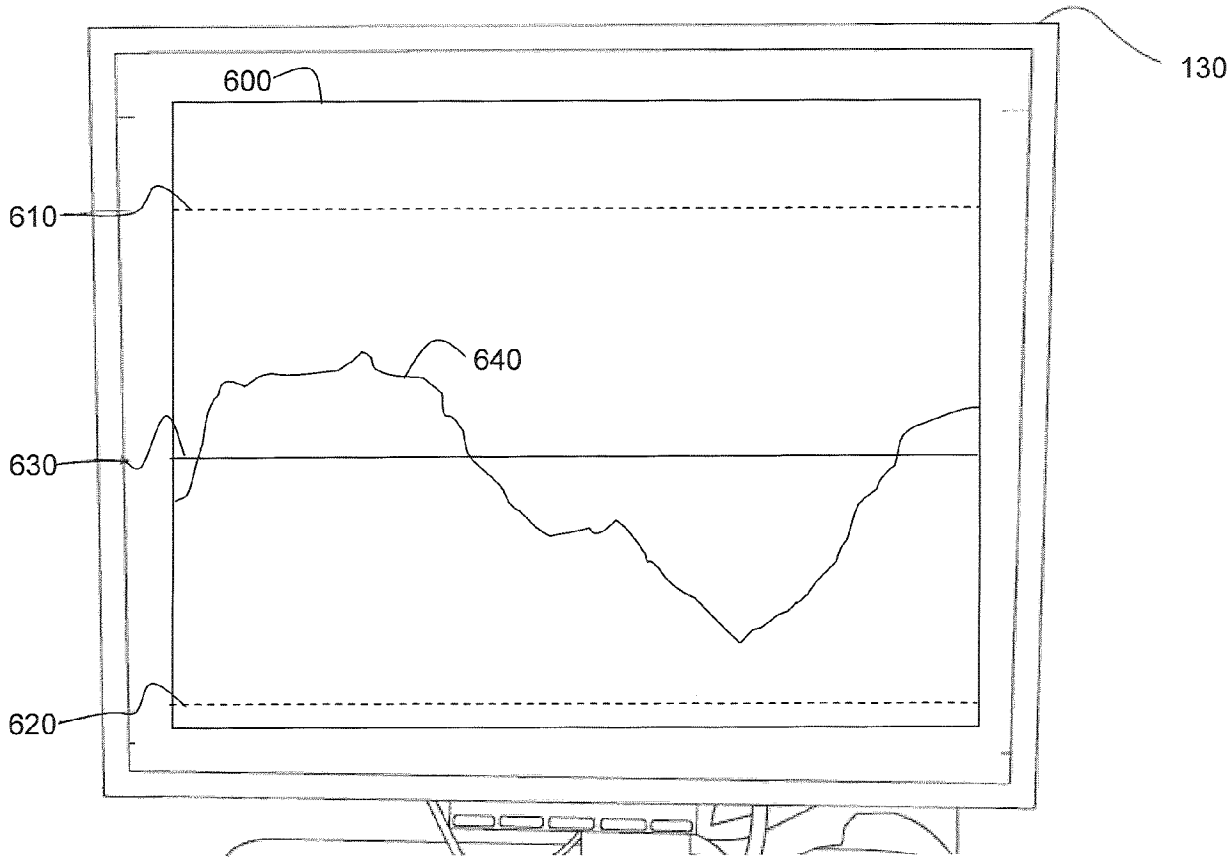
FIG. 6 illustrates an example embodiment of a graph, displayed on a display, showing tracked welding tool pitch angle versus time with respect to an upper pitch angle limit, a lower pitch angle limit, and an ideal pitch angle.

FIG. 6 illustrates an example embodiment of a graph 600, displayed on the display 130, showing tracked welding tool pitch angle 640 versus time with respect to an upper pitch angle limit 610, a lower pitch angle limit 620, and an ideal pitch angle 630. The upper and lower limits 610 and 620 define a range of acceptability between them. Different limits may be predefined for different types of users such as, for example, welding novices, welding experts, and persons at a trade show. The analysis engine 122 may provide a scoring capability, in accordance with an embodiment of the present invention, where a numeric score is provided based on how close to optimum (ideal) a user is for a particular tracked parameter, and depending on the determined level of discontinuities or defects determined to be present in the weld.

Performance data may be stored electronically in a database 140 (see FIG. 3) and managed by a database manager in a manner suitable for indexing and retrieving selected sets or subsets of data. In one embodiment, the data is retrieved and presented to an analyzing user (e.g., a trainer 123) for determining the weld quality of a particular weld joint. The data may be presented in tabular form for analysis by the analyzing user. Pictures, graphs, and or other symbol data may also be presented as is helpful to the analyzing user in determining weld quality. In an alternative embodiment, the performance data may be presented to the analyzing user in a virtual reality setting, whereby the real world welding process is simulated using real world data as captured by the system 100. An example of such a virtual reality setting is discussed in U.S. patent application Ser. No. 12/501,257 filed on Jul. 10, 2009. In this way, the weld joint and corresponding welding process may be reconstructed for review and analysis. Accordingly, the system 100 may be used to archive real data as it relates to a particular welded article. Still, it will be construed that any manner of representing captured data or reconstructing the welding process for the analyzing user may be used as is appropriate for determining weld quality.

In another embodiment, data captured and stored in the database 140 is analyzed by an analyzing module 122 (a.k.a., an analysis engine) of the system 100. The analyzing module 122 may comprise a computer program product executed by the processor based computing device 110. The computer program product may use artificial intelligence. In one particular embodiment, an expert system may be programmed with data derived from a knowledge expert and stored within an inference engine for independently analyzing and identifying flaws within the weld joint. By independently, it is meant that the analyzing module 122 functions independently from the analyzing user to determine weld quality. The expert system may be ruled-based and/or may incorporate fuzzy logic to analyze the weld joint. In this manner, areas along the weld joint may be identified as defective, or potentially defective, and marked for subsequent review by an analyzing user. Determining weld quality and/or problem areas within the weld joint may be accomplished by heuristic methods. As the system 100 analyzes welding processes of the various end users over repeated analyzing cycles, additional knowledge may be gained by the system 100 for determining weld quality.

A neural network or networks may be incorporated into the analysis engine 122 of the system 100 for analyzing data to determine weld quality, weld efficiency and/or weld flaws or problems. Neural networks may comprise software programming that simulates decision making capabilities. In one embodiment, the neural network(s) may process data captured by the system 100 making decisions based on weighted factors. It is noted that the neural network(s) may be trained to recognize problems that may arise from the weld torch position and movement, as well as other critical welding factors. Therefore, as data from the welding process is captured and stored, the system 100 may analyze the data for identifying the quality of the weld joint. Additionally, the system 100 may provide an output device 170 (see FIG. 4) that outputs indications of potential flaws in the weld such as, for example, porosity, weld overfill, and the like.

In capturing performance data, the system 100 incorporates a series of sensors, also referred to as sensor arrays 160, 165 (see FIG. 2). The sensor arrays 160, 165 include emitters and receivers positioned at various locations in proximity to the weldment 15, and more specifically, in proximity to the weld joint 16 for determining the position and orientation of the weld torch 230 in real time (or near real time). In one embodiment, the sensor arrays 160, 165 include acoustical sensor elements. It is noted that the acoustical sensor elements may use waves in the sub-sonic and/or ultra-sonic range. Alternate embodiments are contemplated that use optical sensor elements, infrared sensor elements, laser sensor elements, magnetic sensor elements, or electromagnetic (radio frequency) sensor elements. In this manner, the sensor emitter elements emit waves of energy in any of various forms that are picked up by the sensor receiver elements. To compensate for noise introduced by the welding process, the system 100 may also include bandwidth suppressors, which may be implemented in the form of software and/or electronic circuitry. The bandwidth suppressors are used to condition the sensor signals to penetrate interference caused by the welding arc. Additionally, the system 100 may further incorporate inertial sensors, which may include one or more accelerometers. In this manner, data relating to position, orientation, velocity, and acceleration may be required to ascertain the movements (i.e., motion) of the weld torch 230.

In one embodiment, part of the sensor arrays 160, 165 are received by the weld torch 230. That is to say that a portion of the sensors or sensor elements are affixed with respect to the body of the weld torch 230 (see sensor array [160] *165* of FIG. 2). In other embodiments, sensors and/or sensor elements may be affixed to a portion of the article being welded (see sensor array [165] *160* of FIG. 2). Still any manner of positioning and connecting the sensor elements may be chosen as is appropriate for tracking welding activity.

As an example of sensing and tracking a welding tool 230, in accordance with an embodiment of the present invention, a magnetic sensing capability may be provided. For example, the receiver sensor array 165 may be a magnetic sensor that is mounted on the welding tool 230, and the emitter sensor array 160 may take the form of a magnetic source. The magnetic source 160 may be mounted in a predefined fixed position and orientation with respect to the weldment 15. The magnetic source 160 creates a magnetic field around itself, including the space encompassing the welding tool 230 during use and establishes a 3D spatial frame of reference. The magnetic sensor 165 is provided which is capable of sensing the magnetic field produced by the magnetic source. The magnetic sensor 165 is attached to the welding tool 230 and is operatively connected to the processor based computing device 110 via, for example, a cable, or wirelessly. The magnetic sensor 165 includes an array of three induction coils orthogonally aligned along three spatial directions. The induction coils of the magnetic sensor 165 each measure the strength of the magnetic field in each of the three directions and provide that information to the real time tracking module 121 of the processor based computing device 110. As a result, the system 100 is able to know where the welding tool 230 is in space with respect to the 3D spatial frame of reference established by the magnetic field produced by the magnetic source 160. In accordance with other embodiments of the present invention, two or more magnetic sensors may be mounted on or within the welding tool 230 to provide a more accurate representation of the position and orientation of the welding tool 230, for example. Care is to be taken in establishing the magnetic 3D spatial frame of reference such that the weldment 15, the tool 230, and any other portions of the welding environment do not substantially distort the magnetic field created by the magnetic source 160. As an alternative, such distortions may be corrected for or calibrated out as part of a welding environment set up procedure. Other non-magnetic technologies (e.g., acoustic, optical, electromagnetic, inertial, etc.) may be used, as previously discussed herein, to avoid such distortions, as are well known in the art.

With reference to all of the figures, operation of the system 100 will now be described in accordance with an embodiment of the present invention. The end user 10 activates the system 100 and enters his or her user name via the user interface 135. Once authorized access has been gained, the end user 10 traverses the menu system as prompted by the computer program product 120 via the GUI 135. The system 100 instructs the end user 10 to initiate set up of the welding article 15, which includes entering information about the weldment materials and/or welding process being used. Entering such information may include, for example, selecting a language, entering a user name, selecting a weld coupon type, selecting a welding process and associated axial spray, pulse, or short arc methods, selecting a gas type and flow rate, selecting a type of stick electrode, and selecting a type of flux cored wire.

In one embodiment, the end user enters the starting and ending points of the weld joint 16. This allows the system 100, via the real time tracking module 121, to determine when to start and stop recording the tracked information. Intermediate points are subsequently entered for interpolating the weld joint trajectory as calculated by the system 100. Additionally, sensor emitters and/or receivers 160, 165 are placed proximate to the weld joint at locations suitable for gathering data in a manner consistent with that described herein. After set up is completed, system tracking is initiated and the end user 10 is prompted to begin the welding procedure. As the end user 10 completes the weld, the system 100 gathers performance data including the speed, position and orientation of the weld torch 230 for analysis by the system 100 in determining welder performance characteristics and weld quality characteristics as previously described herein.

In summary, a system and a method for tracking and analyzing welding activity is disclosed. Dynamic spatial properties of a welding tool are sensed during a welding process producing a weld. The sensed dynamic spatial properties are tracked over time and the tracked dynamic spatial properties are captured as tracked data during the welding process. The tracked data is analyzed to determine performance characteristics of a welder performing the welding process and quality characteristics of a weld produced by the welding process. The performance characteristics and the quality characteristics may be subsequently reviewed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

[1. A system for tracking and analyzing welding activity, said system comprising:

means for automatically sensing dynamic spatial properties of a welding tool during a welding process producing a weld;

means for automatically tracking said sensed dynamic spatial properties over time during said welding process;

means for automatically capturing said tracked dynamic spatial properties as tracked data during said welding process; and means for automatically analyzing said tracked data to determine at least one of performance characteristics of a welder performing said welding process and quality characteristics of a weld produced by said welding process.]

[2. The system of claim 1 further comprising means for reviewing said performance characteristics of a welder performing said welding process.]

[3. The system of claim 1 further comprising means for reviewing said quality characteristics of a weld produced by said welding process.]

[4. The system of claim 1 further comprising means for a user to locally interact with said system.]

[5. The system of claim 1 further comprising means for a user to remotely interact with said system.]

[6. The system of claim 1 further comprising means for automatically authorizing access to a user of said system.]

[7. The system of claim 1 wherein said performance characteristics of a welder include at least one of a weld joint trajectory, a travel speed of said welding tool, welding tool pitch and roll angles, an electrode distance to a center weld joint, an electrode trajectory, and a weld time.]

[8. The system of claim 1 wherein said quality characteristics of a weld produced by said welding process include at least one of discontinuities and flaws within regions of a weld produced by said welding process.]

[9. A system for tracking and analyzing welding activity, said system comprising:

at least one sensor array configured to sense dynamic spatial properties of a welding tool during a welding process producing a weld;

a processor based computing device operatively interfacing to said at least one sensor array and configured to track and analyze said dynamic spatial properties of a welding tool over time during a welding process producing a weld; and at least one user interface operatively interfacing to said processor based computing device.]

[10. The system of claim 9 wherein said at least one user interface includes a graphical user interface.]

[11. The system of claim 9 wherein said at least one user interface includes a display device.]

[12. The system of claim 9 further comprising a network interface configured to interface said processor based computing device to an external communication network.]

[13. The system of claim 9 wherein said at least one sensor array includes at least one of acoustical sensor elements, optical sensor elements, magnetic sensor elements, and electromagnetic sensor elements.]

[14. A method for tracking and analyzing welding activity, said method comprising:

sensing dynamic spatial properties of a welding tool during a welding process producing a weld using at least one sensor;

tracking said sensed dynamic spatial properties over time during said welding process using a real time tracking module;

capturing said tracked dynamic spatial properties as tracked data during said welding process using a computer based memory device; and analyzing said tracked data to determine at least one of performance characteristics of a welder performing said welding process and quality characteristics of a weld produced by said welding process using a computer based analysis engine.]

[15. The method of claim 14 further comprising outputting said performance characteristics of a welder performing said welding process to at least one of a display device, a visualization module, and a testing module for review.]

[16. The method of claim 14 further comprising outputting said quality characteristics of a weld produced by said welding process to at least one of a display device, a visualization module, and a testing module for review.]

[17. The method of claim 14 further comprising selecting welding set up parameters for said welding process via a user interface.]

[18. The method of claim 14 further comprising remotely reviewing at least one of said performance characteristics of a welder performing said welding process and said quality characteristics of a weld produced by said welding process, via a communication network.]

[19. The method of claim 14 wherein said performance characteristics of a welder include at least one of a weld joint trajectory, a travel speed of said welding tool, welding tool pitch and roll angles, an electrode distance to a center weld joint, an electrode trajectory, and a weld time.]

[20. The method of claim 14 wherein said quality characteristics of a weld produced by said welding process include at least one of discontinuities and flaws within regions of a weld produced by said welding process.]

*21. A system for tracking welding activity, said system comprising:*

*an optical tracking system comprising an optical sensor and configured to track at least one of a position, a movement, and an orientation of a welding tool during a manual welding process producing a real world weld;*

*a processor based computing system operatively connected to said optical tracking system and configured to analyze data related to said welding process and determine an area along the real world weld that is defective or potentially defective based on said at least one of a position, a movement, and an orientation of said welding tool, said processor based computing system identifying said area for subsequent review by a user; and*

*a graphical display to display information related to weld quality,*

*wherein said processor based computing system is configured to record information related to a welder's identity and performance, and*

*wherein said processor based computing system is configured to record information corresponding to said at least one of a position, a movement, and an orientation of said welding tool in an analysis record.*

*22. A system for tracking welding activity, said system comprising:*

*at least one optical sensor array configured to sense spatial properties of a welding tool during a manual welding process producing a real world weld;*

*a computer operatively connected to said at least one sensor array to determine at least one parameter of said welding tool, said computer configured to analyze data related to said welding process and determine an area along the real world weld that is defective based on said sensed spatial properties, said computer identifying said area for subsequent review by a user; and*

*a user interface to display information related to weld quality,*

*wherein said computer is configured to record information related to a welder's identity and performance, and*

*wherein said computer is configured to record information corresponding to said at least one parameter in an analysis record.*

*23. A system for tracking welding activity, said system comprising:*

*an optical tracking system comprising an optical sensor and configured to track at least one of a position, a movement, and an orientation of a welding tool during a manual welding process producing a real world weld;*

*a computer operatively connected to said optical tracking system, said computer configured to determine at least one parameter of said welding tool; and*

*a graphical display to display a graph having information related to weld quality,*

*wherein said computer is configured to record information related to a welder's performance based on at least said at least one parameter, said computer configured to analyze data related to said welding process and determine an area along the real world weld that is potentially defective based on said at least one of a position, a movement, and an orientation of said welding tool, said computer identifying said area for subsequent review by a user,*

*wherein said computer records information related to at least one of weldment materials, electrode materials, user name, and project ID number, and*

*wherein said computer records information corresponding to said at least one parameter in an analysis record.*

*24. A system for tracking and analyzing welding activity, said system comprising:*

*a welding tool configured to create a real world weld during a manual welding operation;*

*an optical sensor array comprising at least one optical sensor, said optical sensor array configured to sense spatial properties of said welding tool during said welding operation;*

*a processor based computing device operatively connected to said sensor array and configured to receive information from said sensor array related to said sensed spatial properties, said processor based computing device configured to analyze data related to said welding process, said analyzing including determining a plurality of performance parameters for said welding operation, and where said processor based computing device determines at least one location of said real world weld which contains a defect based on said*

*sensed spatial properties, said processor based computing device identifying said at least one location for subsequent review by a user; and*

*a user interface operatively connected to said processor based computing device, said user interface configured to graphically display said plurality of performance parameters and display information relating to said at least one location.*

*25. The system of claim 24, wherein said determination of said defect is based on heuristic methods.*

*26. The system of claim 24 wherein said plurality of performance parameters includes at least one of a weld speed, welding tool pitch angle, welding tool roll angle, and an electrode distance to a center weld joint.*

*27. The system of claim 24, wherein said spatial properties comprise at least one of a position, an orientation, and a movement of said welding tool.*

*28. The system of claim 24, wherein said welding tool comprises a portion of said optical sensor array.*

*29. The system of claim 24, wherein said processor based computing device is configured to record information related to a welder's performance.*

*30. The system of claim 29, wherein said information includes information corresponding to said welder's identity.*

*31. The system of claim 24, wherein said analyzing further includes comparing at least one of said plurality of performance parameters to known good parameters for a particular weld joint configuration.*

*32. The system of claim 24, wherein said determining of said defect is performed by an expert system.*

*33. The system of claim 32, wherein said expert system is a rule-based system.*

* * * * *